(12) United States Patent
Slavejkov et al.

(10) Patent No.: US 8,689,710 B2
(45) Date of Patent: Apr. 8, 2014

(54) COMBUSTION SYSTEM WITH PRECOMBUSTOR

(75) Inventors: Aleksandar Georgi Slavejkov, Allentown, PA (US); Xiaoyi He, Orefield, PA (US); Mark Daniel D'Agostini, Ebensburg, PA (US); Reed Jacob Hendershot, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 850 days.

(21) Appl. No.: 12/238,644

(22) Filed: Sep. 26, 2008

(65) Prior Publication Data

US 2010/0077944 A1   Apr. 1, 2010

(51) Int. Cl.
  *F23B 80/02*   (2006.01)
  *F23C 9/08*   (2006.01)
  *F23D 1/00*   (2006.01)

(52) U.S. Cl.
  USPC .......... 110/261; 110/204; 110/104 B; 110/263

(58) Field of Classification Search
  CPC ................... F23C 5/24; F23C 2202/40; F23C 2900/03004
  USPC .............. 110/204, 208, 104 B, 260, 261, 263
  See application file for complete search history.

(56) References Cited

U.S. PATENT DOCUMENTS

| | | | | |
|---|---|---|---|---|
| 1,191,225 A | * | 7/1916 | Quigley | ..................... 110/104 B |
| 4,130,388 A | * | 12/1978 | Flanagan | ..................... 431/116 |
| 4,957,545 A | | 9/1990 | Hikosaka et al. | |
| 5,256,058 A | | 10/1993 | Slavejkov et al. | |
| 5,346,390 A | | 9/1994 | Slavejkov et al. | |
| 5,547,368 A | | 8/1996 | Slavejkov et al. | |
| 5,823,759 A | | 10/1998 | Swithenbank | |
| 5,950,417 A | | 9/1999 | Robertson et al. | |
| 6,089,855 A | * | 7/2000 | Becker et al. | ..................... 431/9 |
| 6,102,687 A | * | 8/2000 | Butcher et al. | ................. 431/115 |
| 6,298,654 B1 | | 10/2001 | Vermes et al. | |
| 6,752,620 B2 | * | 6/2004 | Heier et al. | ....................... 431/8 |
| 6,773,256 B2 | * | 8/2004 | Joshi et al. | ........................ 431/9 |
| 6,807,914 B2 | * | 10/2004 | Leisse et al. | .................. 110/106 |
| 7,632,090 B2 | * | 12/2009 | Li et al. | ............................ 431/10 |

FOREIGN PATENT DOCUMENTS

| | | |
|---|---|---|
| WO | 2007117243 A1 | 10/2007 |
| WO | 2008/005460 A2 | 1/2008 |

OTHER PUBLICATIONS

Kevin Boyle Fogash, Combustion System With Steam or Water Injection, U.S. Appl. No. 12/238,632, filed Sep. 26, 2008.
Mark Daniel D'Agostini, Oxy/Fuel Combustion System With Little or No Excess Oxygen, U.S. Appl. No. 12/238,612, filed Sep. 26, 2008.

(Continued)

*Primary Examiner* — Kenneth Rinehart
*Assistant Examiner* — David J Laux
(74) *Attorney, Agent, or Firm* — Michael Kevin Boyer; Larry S. Zelson

(57) ABSTRACT

A precombustor having a chamber having a first end and a second end, and an inlet configured to deliver a substantially parallel flow of solid fuel surrounded by oxygen at the first end. The first end further includes a recirculation step and the second end fluidly communicates with a furnace. The inlet and the recirculation step are arranged to form a recirculation zone of at least a portion of the solid fuel and the oxygen. A combustion system and method for operating a combustion system are also disclosed.

21 Claims, 22 Drawing Sheets

(56) References Cited

OTHER PUBLICATIONS

Mark Daniel D'Agostini, Oxy/Fuel Combustion System With Minimized Flue Gas Recirculation, U.S. Appl. No. 12/238,657, filed Sep. 26, 2008.

Reed Jacob Hendershot, Convective Section Combustion, U.S. Appl. No. 12/238,671, filed Sep. 26, 2008.

Reed Jacob Hendershot, Oxy/Fuel Combustion System Having Combined Convective Section and Radiant Section, U.S. Appl. No. 12/238,695, filed Sep. 26, 2008.

Mark Daniel D'Agostini, Process Temperature Control in Oxy/Fuel Combustion System, U.S. Appl. No. 12/238,731, filed Sep. 26, 2008.

Mark Daniel D'Agostini, Oxygen Control System for Oxygen Enhanced Combustion of Solid Fuels, U.S. Appl. No. 12/138,755, filed Jun. 13, 2008.

Jeffrey William Kloosterman, Transient Operation of Oxy/Fuel Combustion System, U.S. Appl. No. 12/238,713, filed Sep. 26, 2008.

Mark Daniel D'Agostini, Combustion System With Precombustor, U.S. Appl. No. 61/100,372, filed Sep. 26, 2008.

Mark Daniel D'Agostini, Combustion System With Precombustor for Recycled Flue Gas, U.S. Appl. No. 12/566,819, filed Sep. 25, 2009.

* cited by examiner

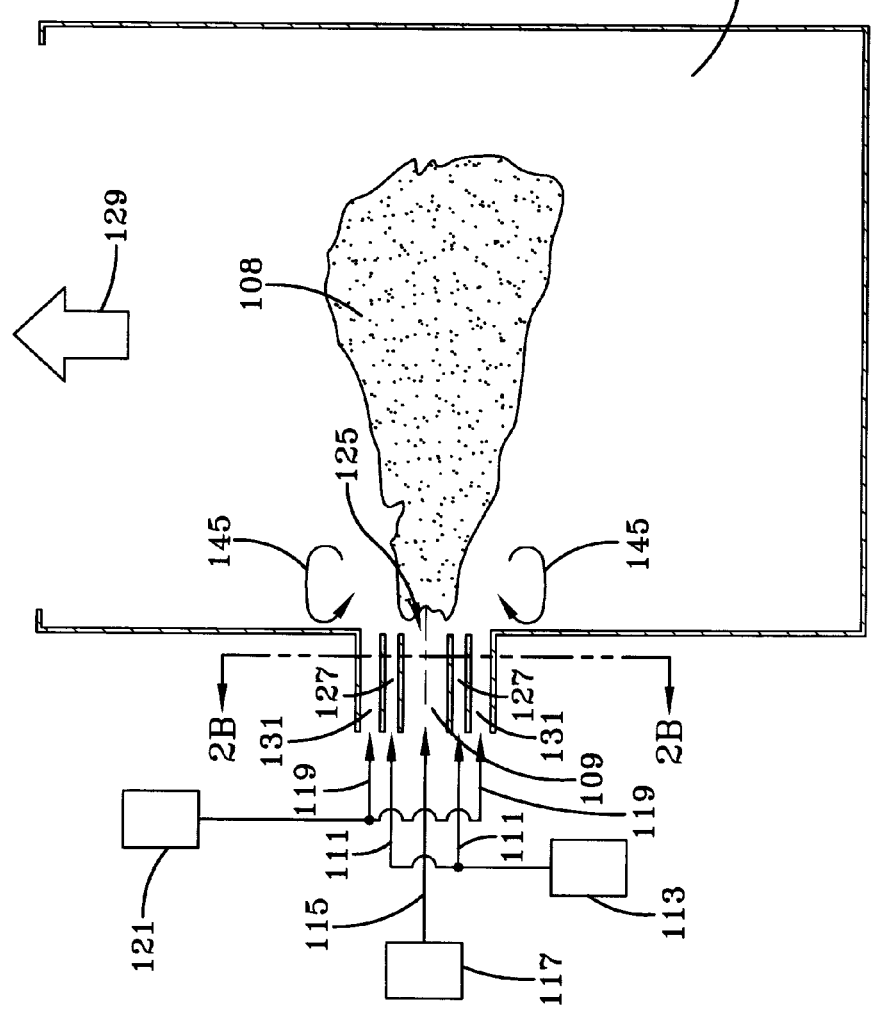
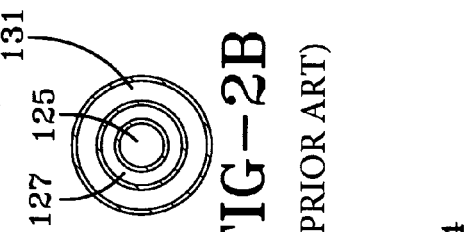
FIG-2A (PRIOR ART)
FIG-2B (PRIOR ART)

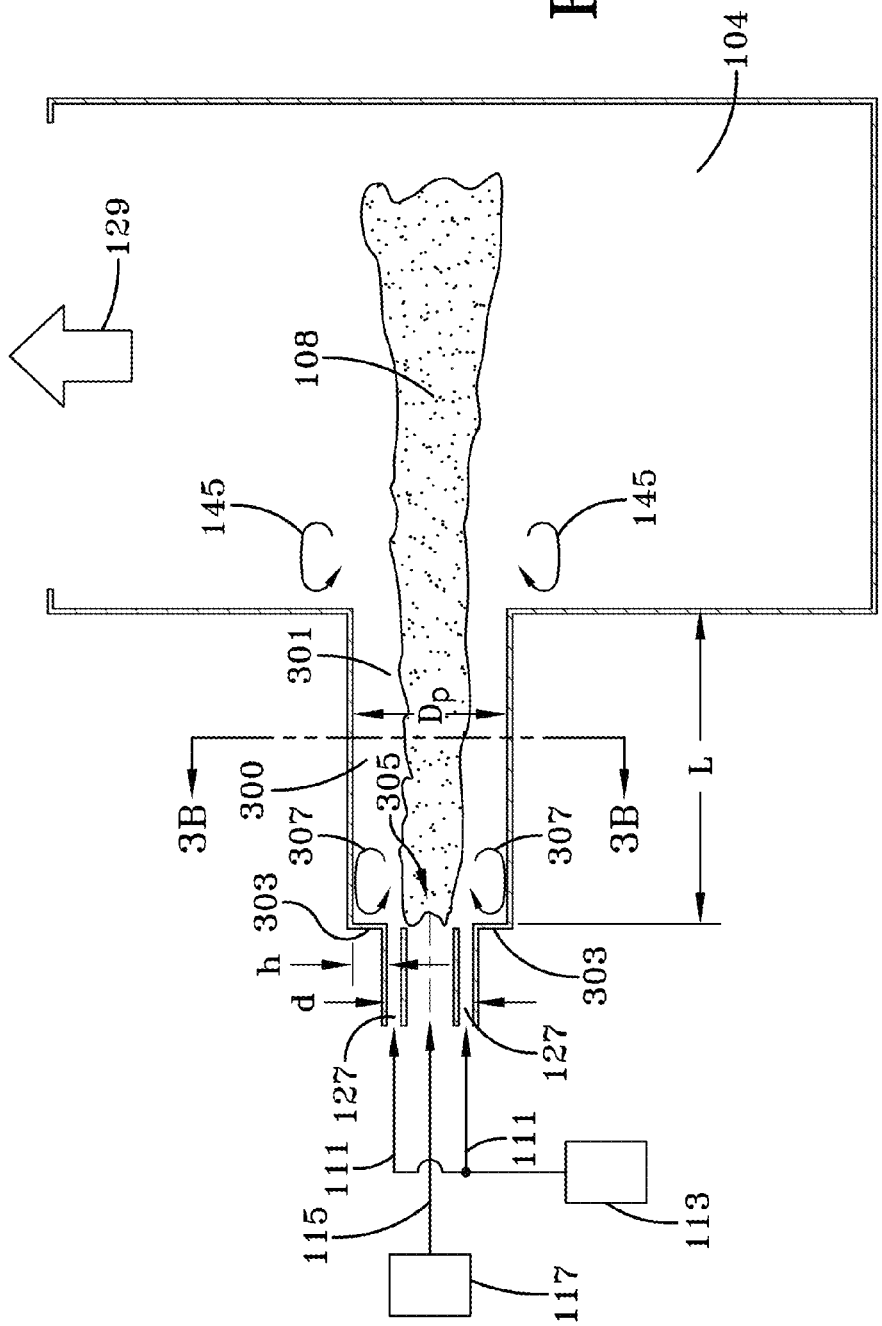

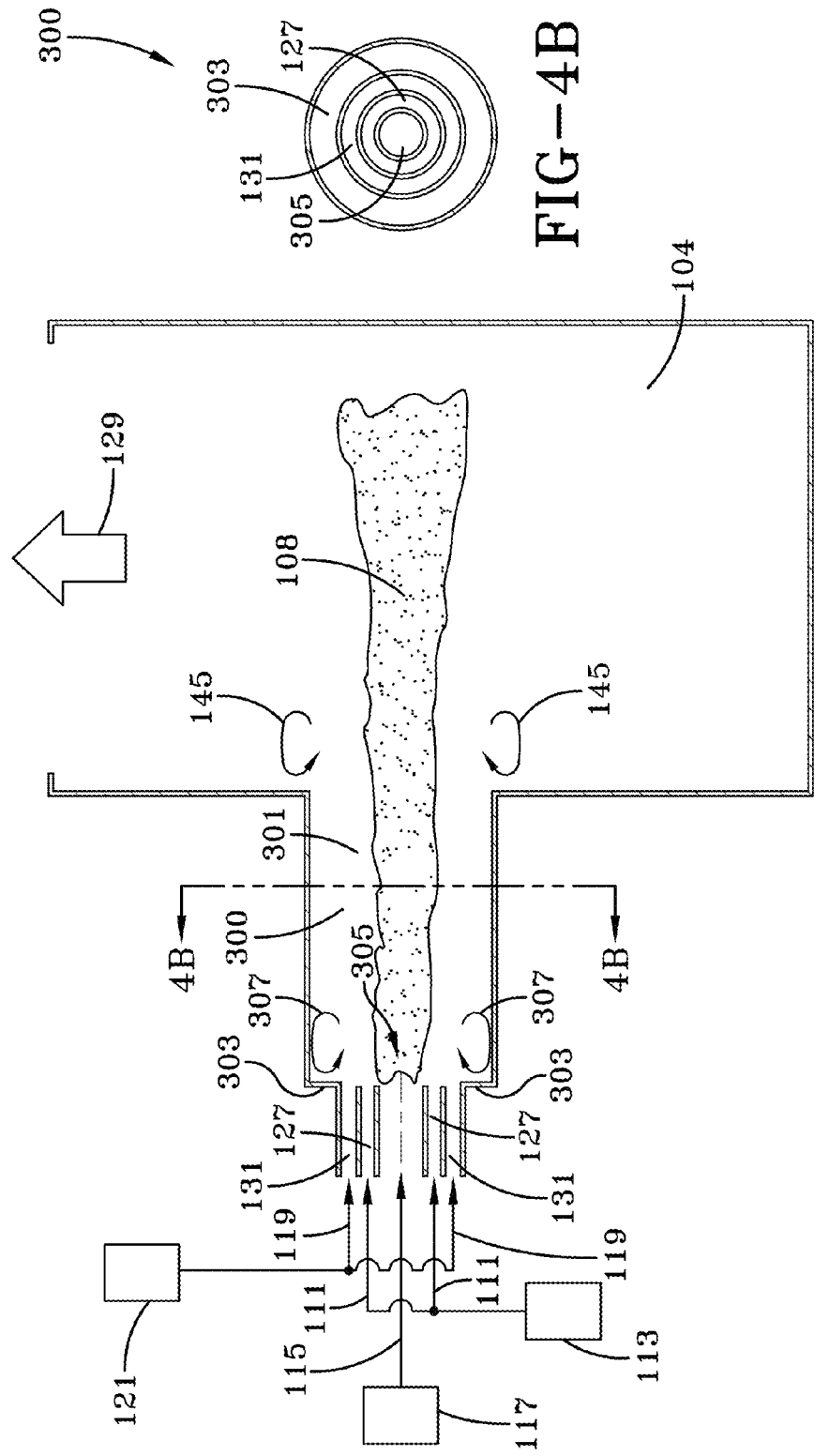

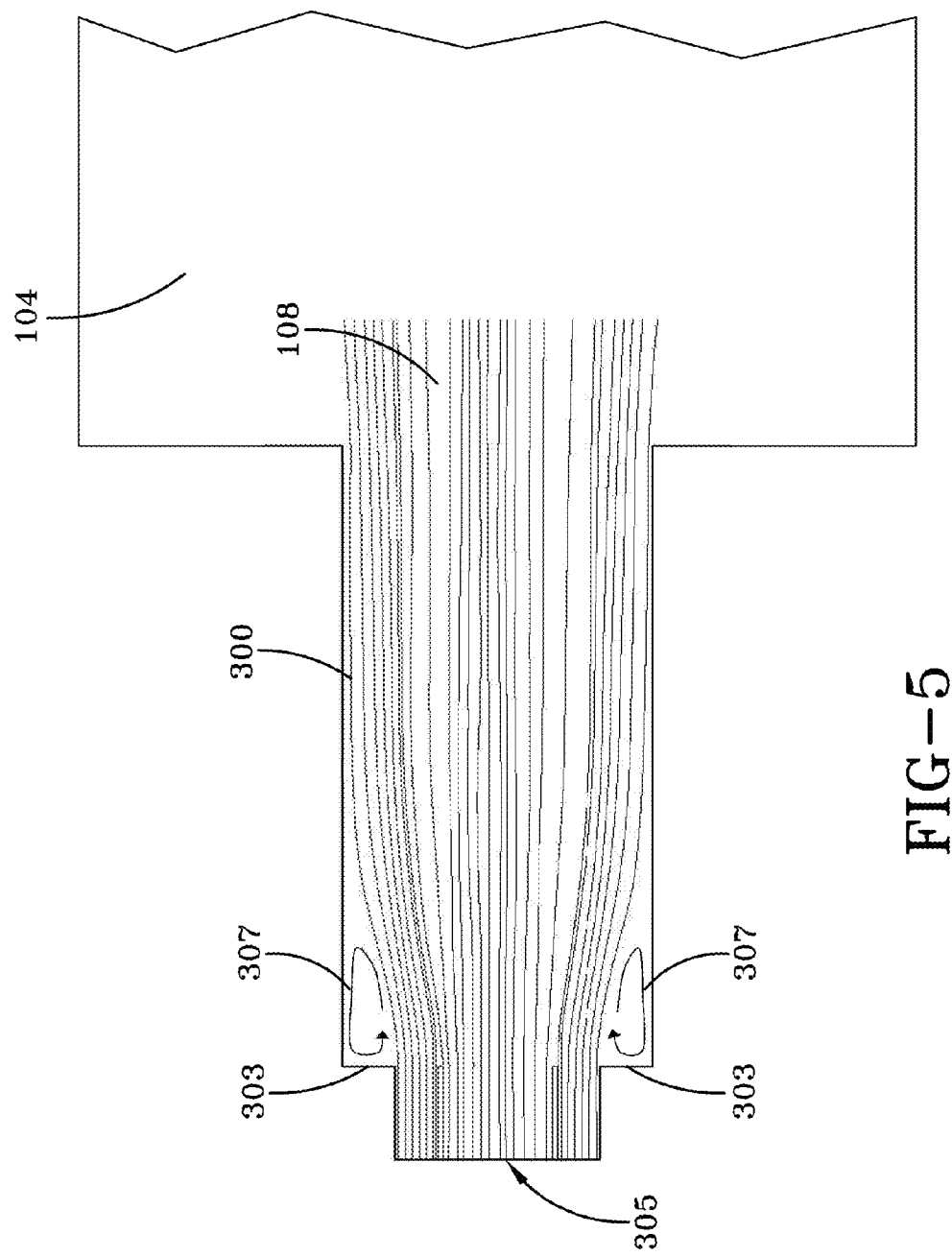

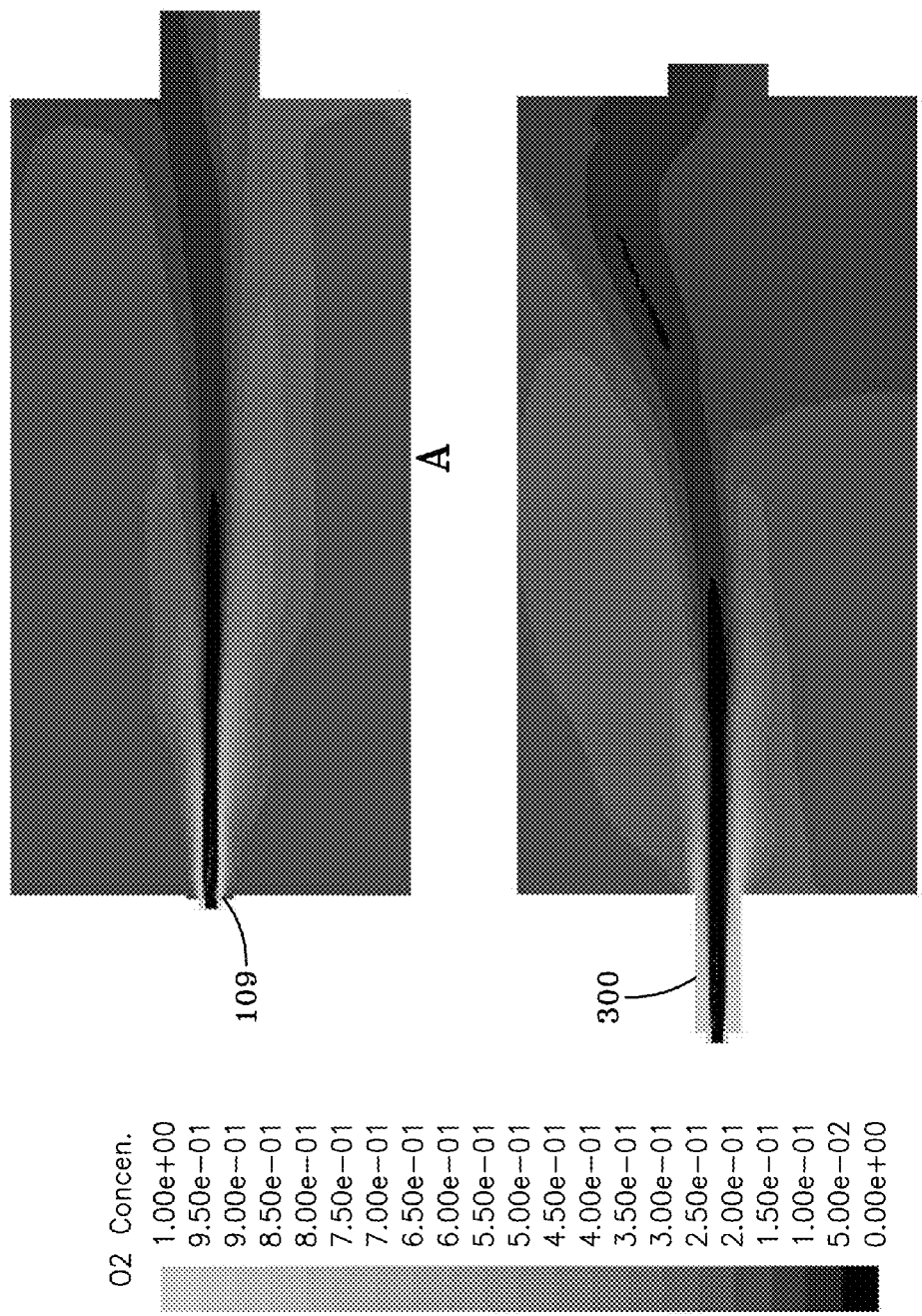

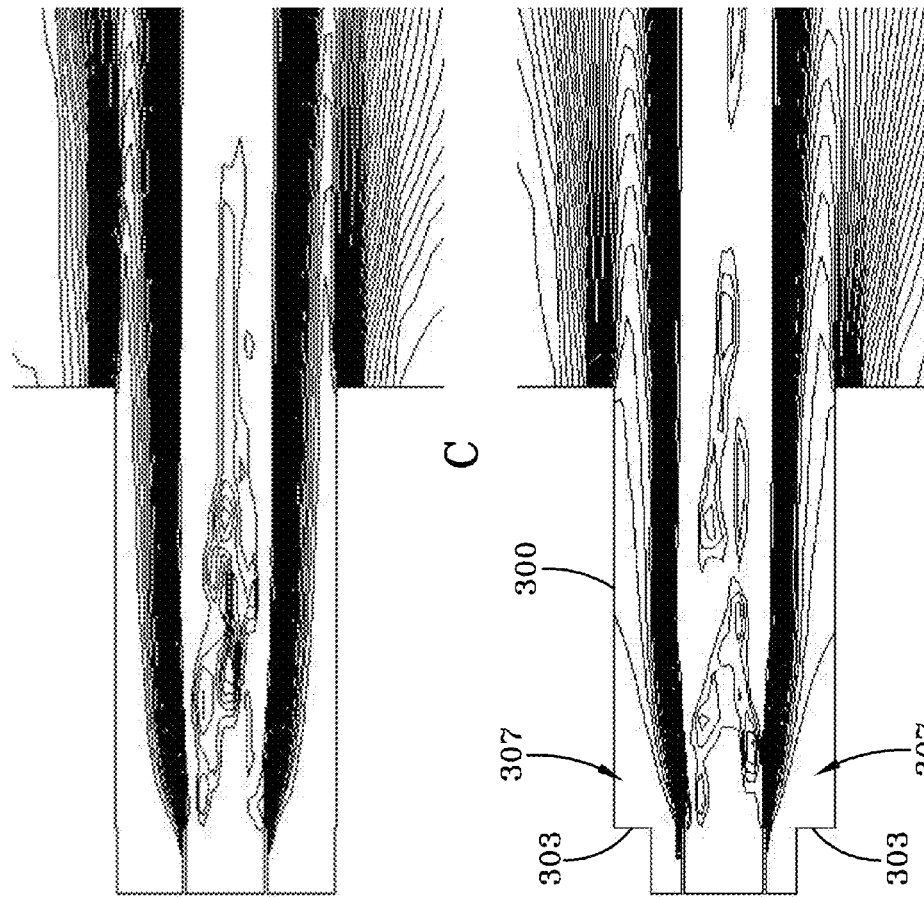

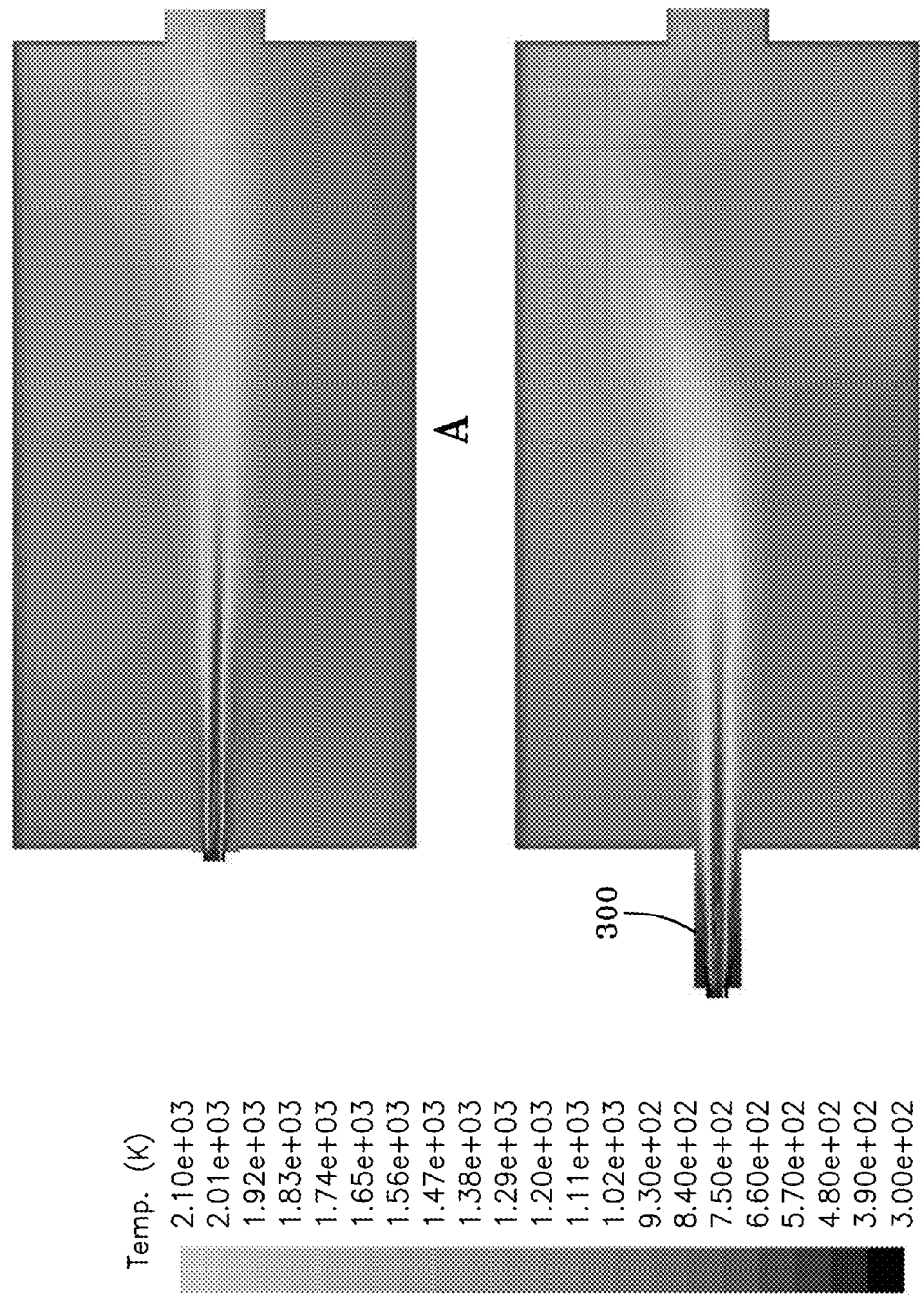

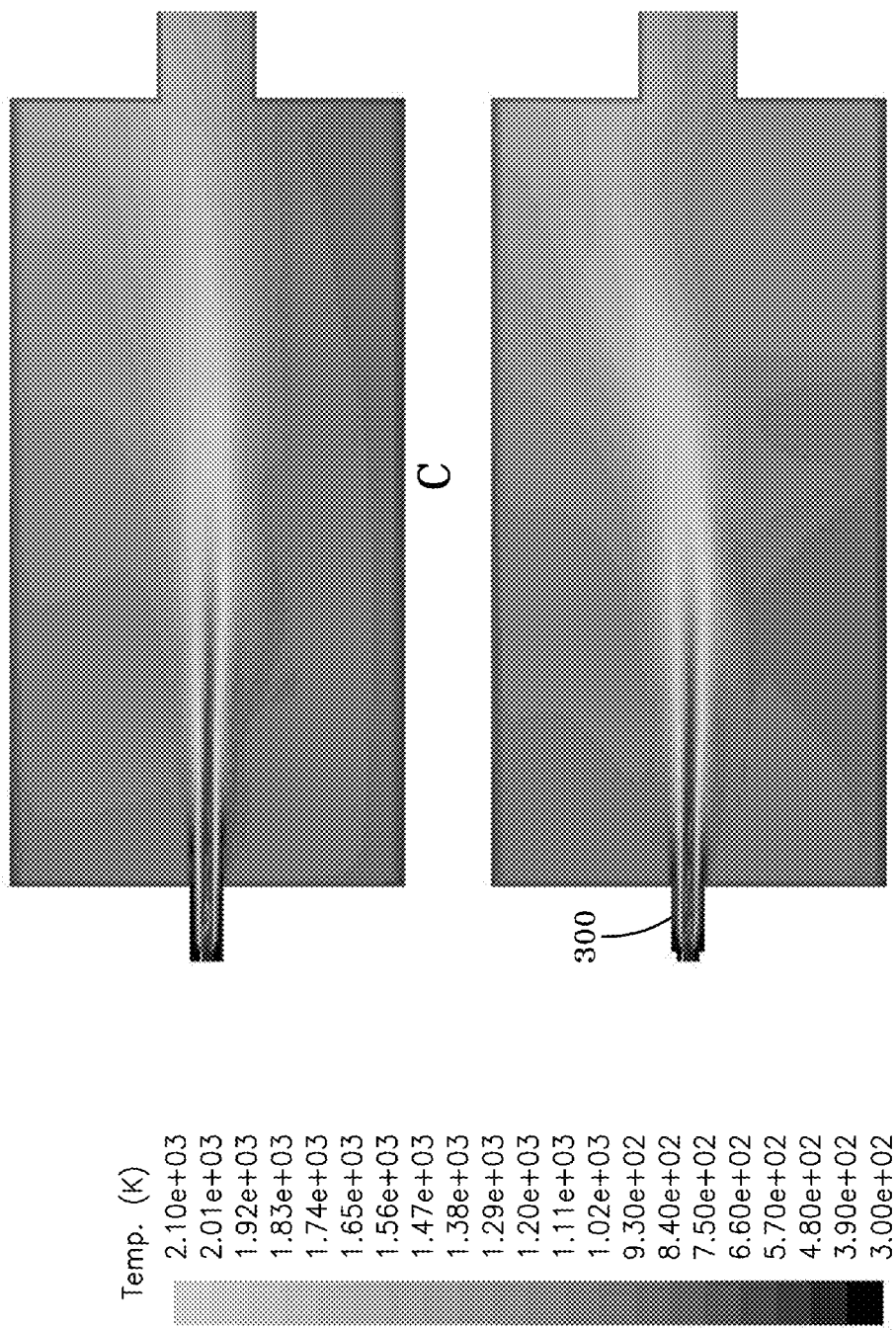

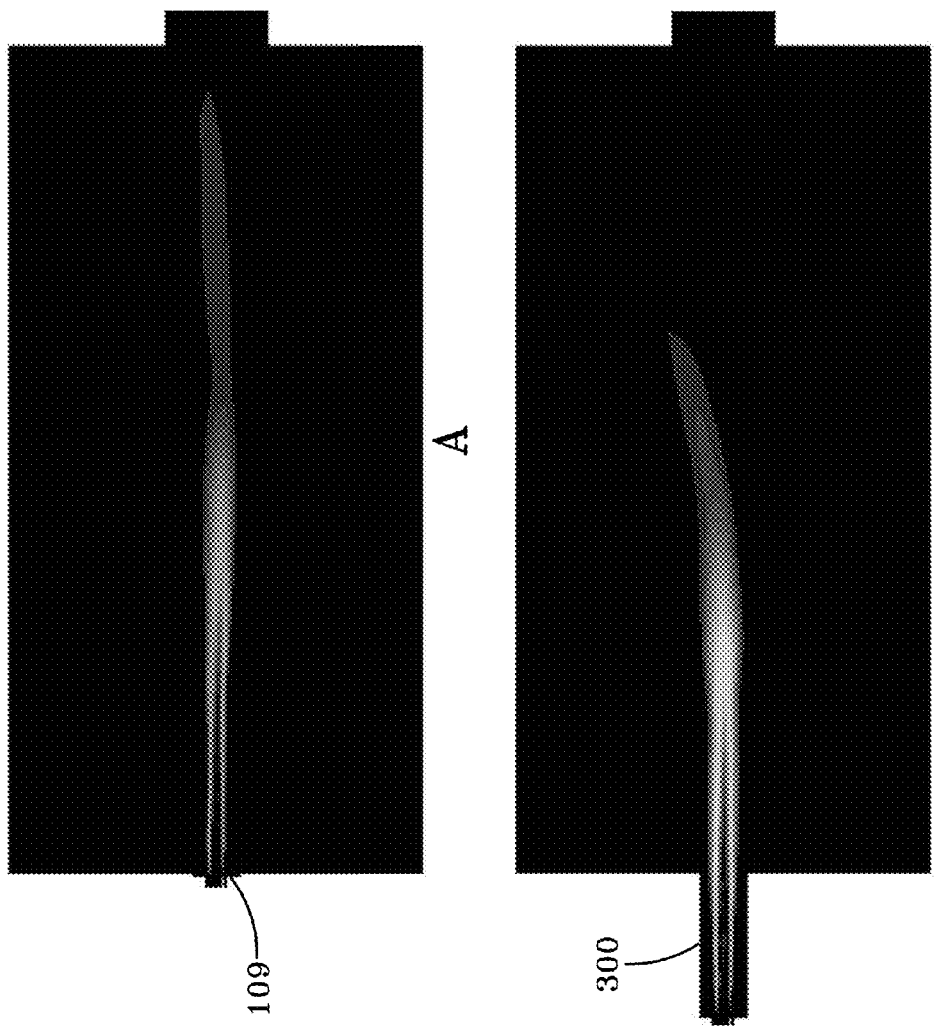

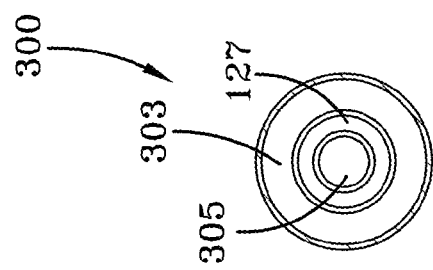
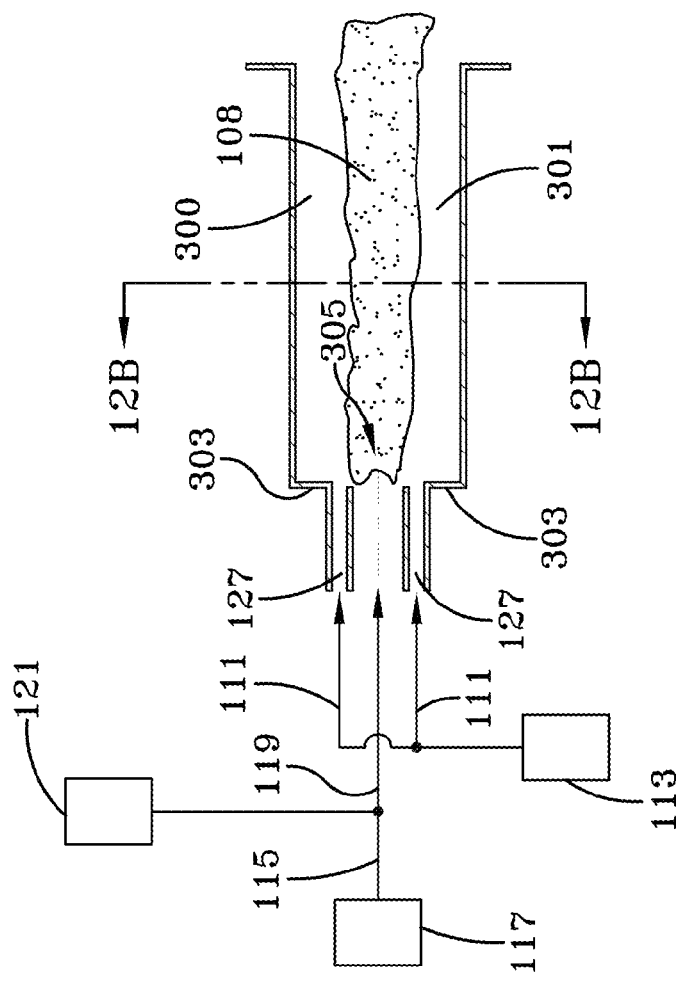

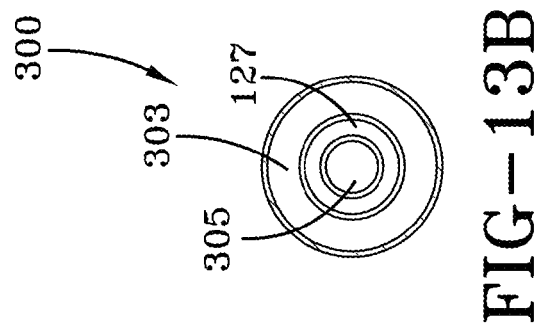
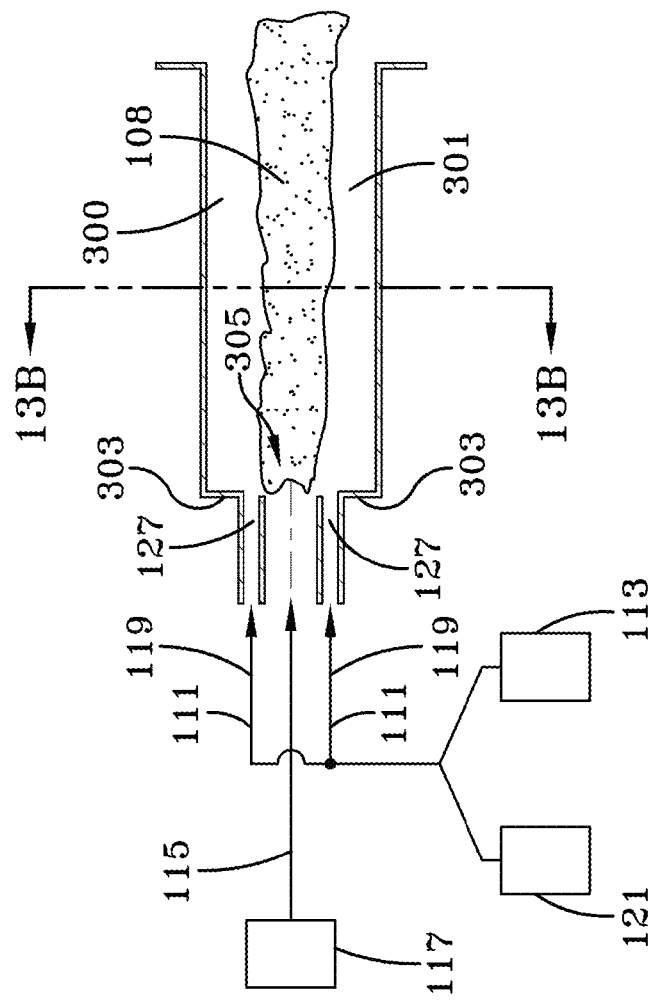

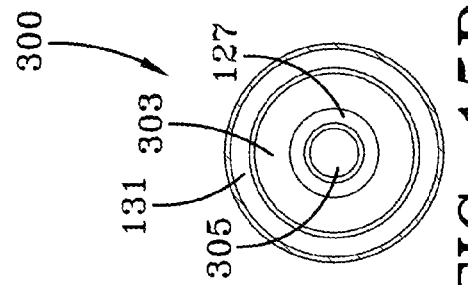
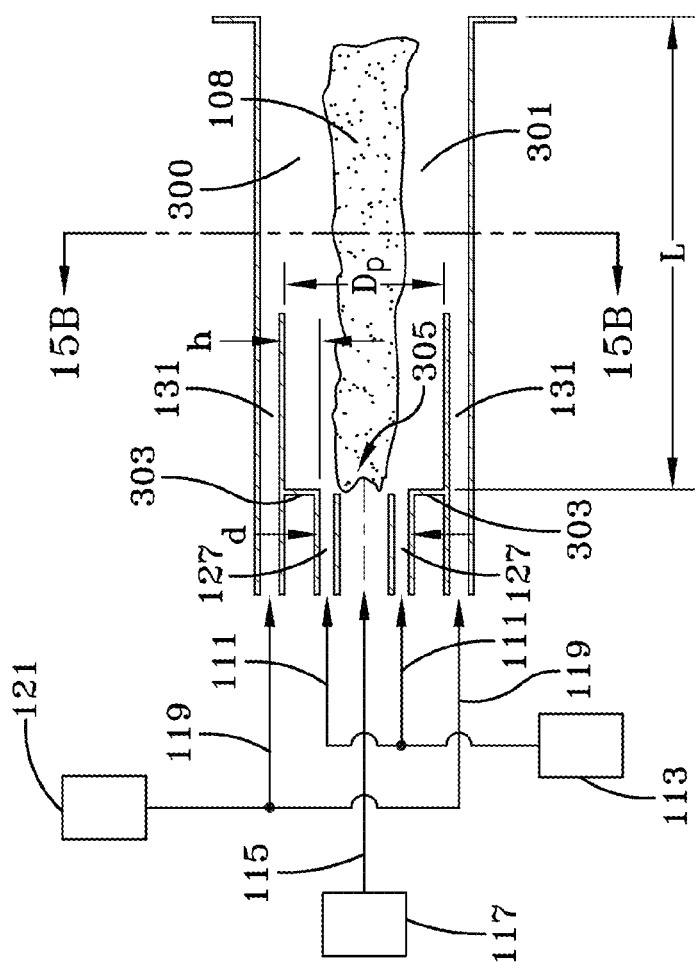

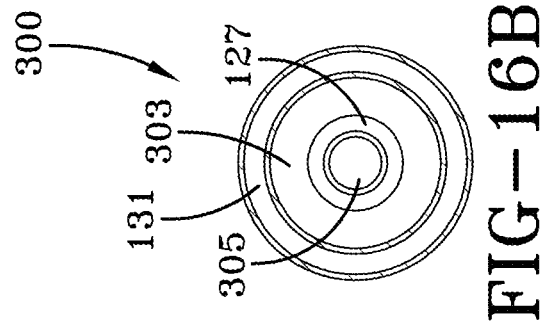
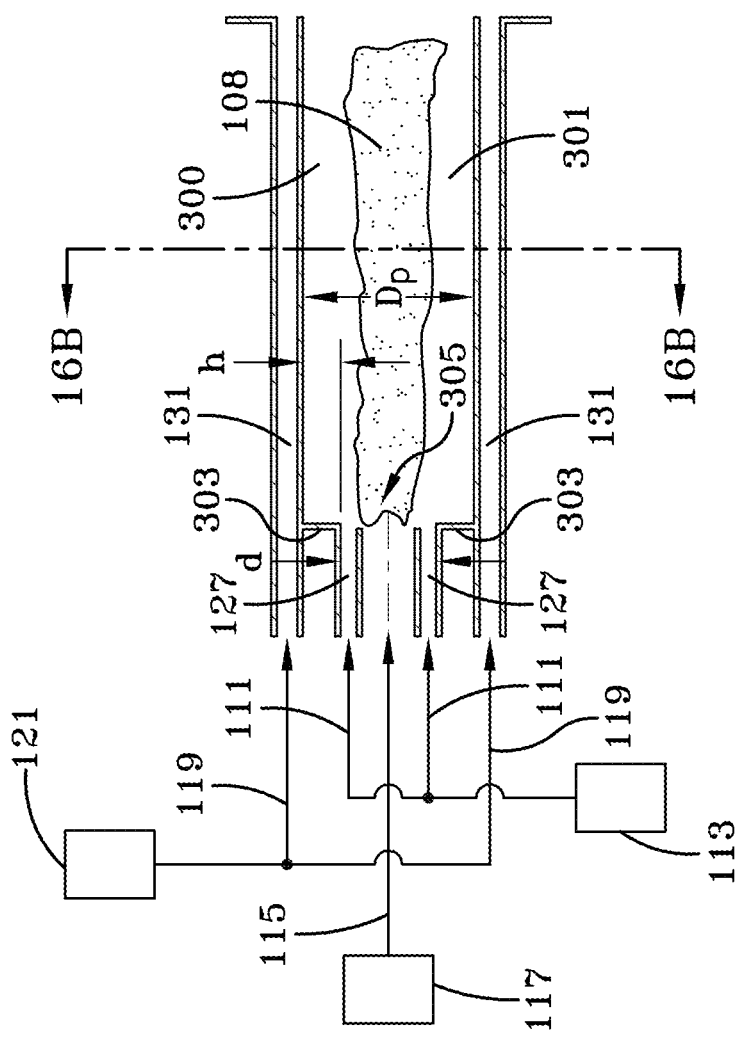

COMBUSTION SYSTEM WITH PRECOMBUSTOR

CROSS-REFERENCE TO RELATED APPLICATIONS

This application is related to application Ser. No. 12/238,612, entitled "OXY/FUEL COMBUSTION SYSTEM WITH LITTLE OR NO EXCESS OXYGEN", filed contemporaneously with this application on Sep. 26, 2008, assigned to the assignee of the present disclosure and which is herein incorporated by reference in its entirety, application Ser. No. 12/238,632, entitled "COMBUSTION SYSTEM WITH STEAM OR WATER INJECTION", filed contemporaneously with this application on Sep. 26, 2008, assigned to the assignee of the present disclosure and which is herein incorporated by reference in its entirety, application Ser. No. 12/238,657, entitled "OXY/FUEL COMBUSTION SYSTEM WITH MINIMIZED FLUE GAS RECIRCULATION", filed contemporaneously with this application on Sep. 26, 2008, assigned to the assignee of the present disclosure and which is herein incorporated by reference in its entirety, application Ser. No. 12/238,671, entitled "CONVECTIVE SECTION COMBUSTION", filed contemporaneously with this application on Sep. 26, 2008, assigned to the assignee of the present disclosure and which is herein incorporated by reference in its entirety, application Ser. No. 12/238,695, entitled "OXY/FUEL COMBUSTION SYSTEM HAVING COMBINED CONVECTIVE SECTION AND RADIANT SECTION", filed contemporaneously with this application on Sep. 26, 2008, assigned to the assignee of the present disclosure and which is herein incorporated by reference in its entirety, application Ser. No. 12/238,731, entitled "PROCESS TEMPERATURE CONTROL IN OXY/FUEL COMBUSTION SYSTEM", filed contemporaneously with this application on Sep. 26, 2008, assigned to the assignee of the present disclosure and which is herein incorporated by reference in its entirety, Application No. 61/100,372, entitled "COMBUSTION SYSTEM WITH PRECOMBUSTOR", filed contemporaneously with this application on Sep. 26, 2008, assigned to the assignee of the present disclosure and which is herein incorporated by reference in its entirety.

FIELD OF THE INVENTION

The present disclosure is directed to a combustion system. In particular, the present disclosure is directed to an oxy/fuel combustion system having increased combustion residence time.

BACKGROUND OF THE INVENTION

Energy demands are an ongoing problem in the United States and world-wide. As a result of these energy demands, new sources of energy and sources of more efficient harnessing of energy are needed. Systems for providing new sources of energy and more efficient methods of harnessing energy relating to coal may meet the energy demands.

Due to slower overall combustion kinetics, excess oxygen requirements for coal combustion and other solid fuel combustion are generally much higher than for gaseous and liquid fuels. For example, whereas the stoichiometric ratio (i.e. ratio of actual to theoretical minimum $O_2$ required) for gas combustion is often 1.05 (5% excess) or less, the stoichiometric ratio for coal combustion is more typically in the vicinity of 1.2 (20% excess). While operating with a higher stoichiometric ratio, air-coal combustion results in higher fan power requirements (typically a fraction of a percent of gross power generation of the steam turbine) and stack sensible enthalpy losses. As such, the efficiency of oxy/coal combustion is much lower (typically of the order of several percent of gross generation).

The combustion of coal for power boilers is typically performed using air as the oxidant. As $CO_2$ sequestration becomes more prevalent and legislation and regulations require sequestration for coal fired plants, the use of synthetic air with a high concentration of $O_2$ (i.e. oxygen volumetric concentration >35%) and substantially pure $O_2$ as the oxidant will become more desirable due to the increased concentration of $CO_2$ in the flue gas stream of oxy/coal combustion systems. However, the combustion process of coal in high $O_2$ concentration synthetic air and substantially pure $O_2$ (referred to collectively as oxy/coal combustion) is different than coal combustion in air (referred to as air/coal combustion). Oxy/coal combustion is different than air/coal combustion because oxy/coal combustion typically has a higher flame temperature and different flame momentum. These differences become especially important for retrofit installations because the oxy/coal flame must fit within the existing firebox. Additionally, as the oxygen concentration in the oxidant for oxy/coal combustion increases, the flame temperature and concentration of slag forming components in the furnace also increases.

Therefore, there is an unmet need to provide components and systems for oxy/coal combustion to provide increased contact time between oxygen and coal to provide desirable combustion properties.

SUMMARY OF THE INVENTION

An aspect of the present disclosure includes a precombustor having a chamber having a first end and a second end, and an inlet configured to deliver a substantially parallel flow of solid fuel surrounded by oxygen at the first end. The first end further includes a recirculation step and the second end fluidly communicates with a furnace. The inlet and the recirculation step are arranged to form a recirculation zone of at least a portion of the solid fuel and the oxygen.

Another aspect of the present disclosure includes a combustion system having a furnace and at least one precombustor. The precombustor includes a chamber having a first end and a second end, and an inlet configured to deliver a substantially parallel flow of solid fuel surrounded by oxygen at the first end. The first end further includes a recirculation step and the second end fluidly communicates with the furnace. The inlet and the recirculation step are arranged to form a recirculation zone of at least a portion of the solid fuel and the oxygen.

Still another aspect of the present disclosure includes providing a furnace and providing at least one precombustor. The precombustor includes a chamber having a first end and a second end, and an inlet configured to deliver a substantially parallel flow of solid fuel surrounded by oxygen at the first end. The first end further includes a recirculation step and the second end fluidly communicates with the furnace. The method includes delivering the solid fuel and the oxygen to the inlet to form a recirculation zone of at least a portion of the solid fuel and the oxygen.

Still another further advantage of embodiments of the present disclosure is increased residence time and more complete combustion prior to and immediately after entry into the furnace.

Still another advantage of embodiments of the present disclosure is that recirculation zones serve as a buffer providing thermal protection for the walls of the precombustor.

Another advantage of the embodiments of the present disclosure is that the recirculation zones serve as a buffer providing protection between the corrosive furnace environment and the burner nozzle.

Another advantage of the embodiments of the present disclosure is increased flame stability.

Further aspects of the method and system are disclosed herein. The features as discussed above, as well as other features and advantages of the present invention will be appreciated and understood by those skilled in the art from the following detailed description and drawings.

BRIEF DESCRIPTION OF THE DRAWINGS

FIG. 2A illustrates a diagrammatic representation of another known combustion system.

FIG. 2B is a sectional view of the system of FIG. 2A taken in direction 2B-2B.

FIG. 3A illustrates a diagrammatic representation of a combustion system according to an embodiment of the present disclosure.

FIG. 3B is a sectional view of the system of FIG. 3A taken in direction 3B-3B.

FIG. 4A illustrates a diagrammatic representation of a combustion system according to another embodiment of the present disclosure.

FIG. 4B is a sectional view of the system of FIG. 4A taken in direction 4B-4B.

FIG. 5 illustrates a representation of flowlines of an oxy/coal burner attached to a precombustor according to an embodiment of the disclosure.

FIG. 9 shows temperature profiles for fuel streams of combustion systems with and without precombustors.

FIG. 12A illustrates a diagrammatic representation of a precombustor according to an embodiment of the present disclosure.

FIG. 12B is a sectional view of the system of FIG. 12A taken in direction 12B-12B.

FIG. 13A illustrates a diagrammatic representation of a precombustor according to another embodiment of the present disclosure.

FIG. 13B is a sectional view of the system of FIG. 13A taken in direction 13B-13B.

FIG. 15A illustrates a diagrammatic representation of a precombustor according to another embodiment of the present disclosure.

FIG. 15B is a sectional view of the system of FIG. 15A taken in direction 15B-15B.

FIG. 16A illustrates a diagrammatic representation of a precombustor according to another embodiment of the present disclosure.

FIG. 16B is a sectional view of the system of FIG. 16A taken in direction 16B-16B.

Wherever possible, the same reference numbers will be used throughout the drawings to represent the same parts.

DETAILED DESCRIPTION OF THE INVENTION

Figures 1A, 1B:
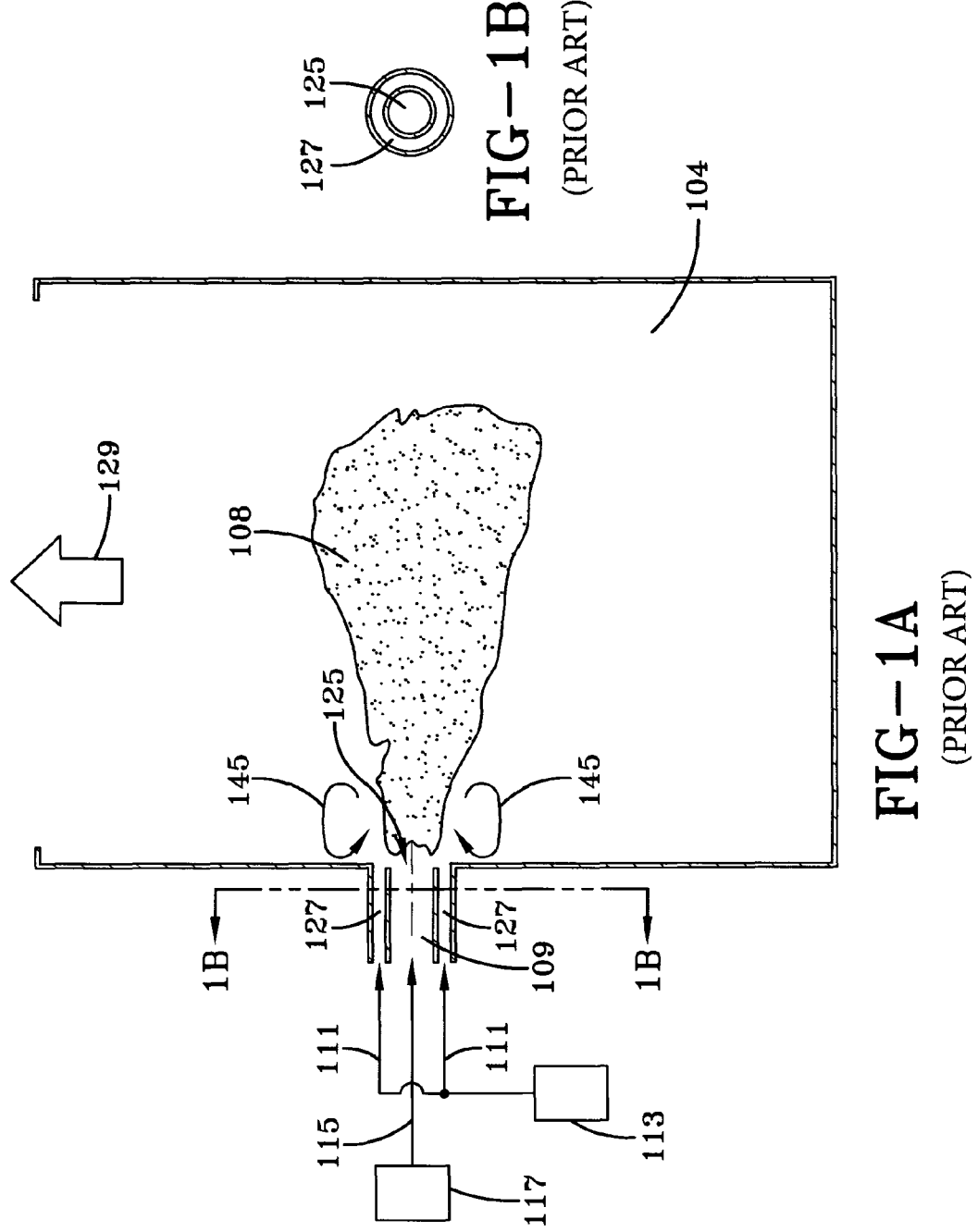
FIG. 1A illustrates a diagrammatic representation of a known combustion system.
FIG. 1B is a sectional view of the system of FIG. 1A taken in direction 1B-1B.
Figure 6:
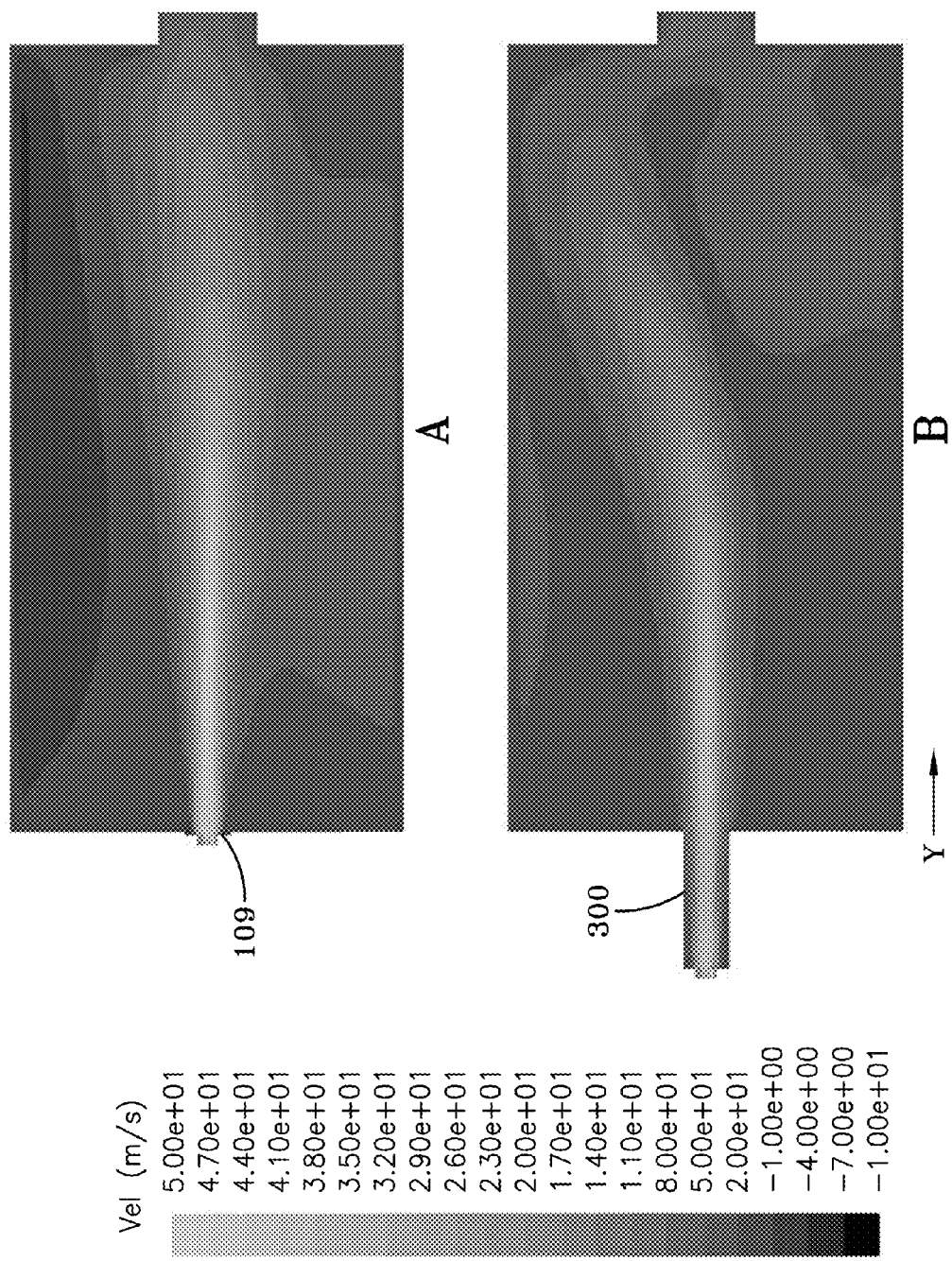
FIG. 6 shows velocity profiles for fuel streams of combustion systems with and without precombustors.
Figure 6:
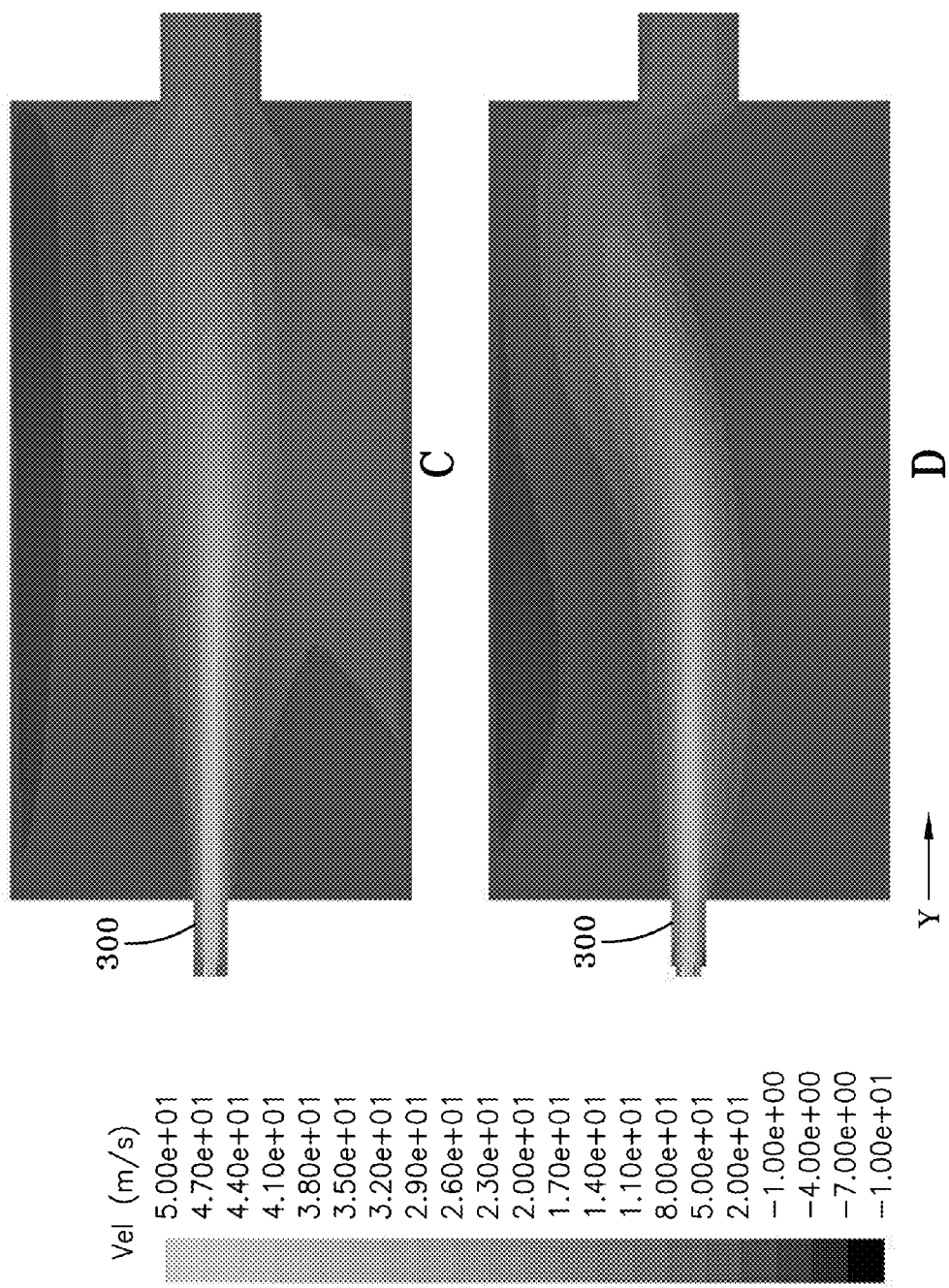
Figure 7:
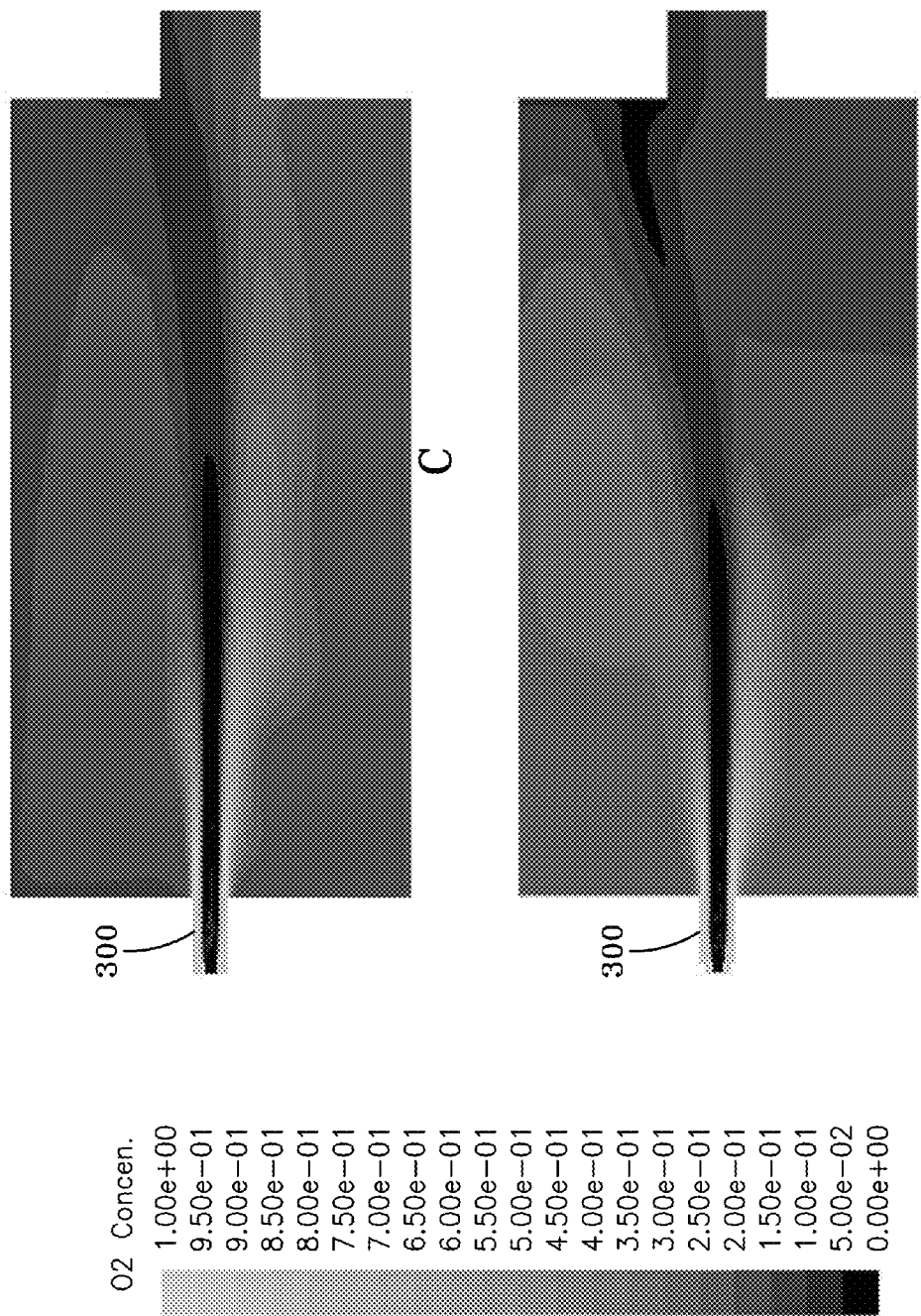
FIG. 7 shows oxygen concentration for fuel streams of combustion systems with and without precombustors.

As used herein, the term "solid fuel" refers to any solid fuel suitable for combustion purposes. For example, the disclosure may be used with many types of solid fuels, including but not limited to: anthracite, bituminous, sub-bituminous, and lignitic coals; tar; bitumen; petroleum coke; paper mill sludge solids and sewage sludge solids; wood; peat; grass; and combinations and mixtures of all of those fuels. As used herein, the term "oxygen" refers to an oxidizer with an $O_2$ concentration greater than 30 mol %; preferably greater than 80 mol %. As used herein, the term oxy/coal combustion refers to coal combustion in oxygen, the term air/coal combustion refers to coal combustion in air, the term oxy/fuel combustion refers to solid fuel combustion in oxygen, and the term air/fuel combustion refers to solid fuel combustion in air. As used herein, the term "combustion fluid" refers to a fluid formed from and/or mixed with the products of combustion, which may be utilized for convective heat transfer. The term is not limited to the products of combustion and may include fluids mixed with or otherwise traveling through at least a portion of combustion system. As used herein, the term "recycled flue gas" or "RFG" refers to combustion fluid exiting the convective section that is recirculated to any portion of the system. As used here, the term "flue gas recycle" or "FGR" refers to a configuration permitting the combustion fluid to be recycled into recycled flue gas.

In order to provide efficient boiler or furnace operation, it is desirable to facilitate stable combustion. Stable combustion of pulverized fuel is dependent on factors such as the pulverized fuel grind size, porosity, volatile content, burner aerodynamics, combustion chamber temperature and overall stoichiometry. Generally, increasing the fuel volatile content improves flame stability since the volatile combustion is a principal source of particle heat-up during the initial stages of char (i.e. solid particle) burning.

The combustion of coal for power boilers is traditionally performed using air as the oxidant. Utilizing $CO_2$ sequestration in coal-fired plants, results in the use of synthetic air ($O_2/CO_2$ mixture with $O_2$ concentration less than 35%) and substantially pure $O_2$ as the oxidant to be more desirable due to the increased concentration of $CO_2$ in the flue gas stream.

However, the combustion process of coal in synthetic air and substantially pure $O_2$ (referred to collectively as oxy/coal combustion) is different than coal combustion in air (referred to as air/coal combustion). Oxy/coal combustion is different than air/coal combustion because oxy/coal combustion typically has a higher flame temperature and different flame momentum. These differences become especially important for retrofit installations because the oxy/coal flame must fit within the existing firebox. Additionally, as the oxygen concentration in the oxidant for oxy/coal combustion increases, the flame temperature and concentration of slag forming components in the furnace also increases.

General schematics of known oxy/coal burners without precombustors are shown in FIGS. 1A, 1B, 2A and 2B. FIGS. 1A, 1B, 2A and 2B show an oxy/coal burner without a precombustor. The arrangement shown in FIGS. 1A, 1B, 2A and 2B includes a burner 109 that opens into a furnace 104. Oxygen 111 is fed to the burner 109 via oxygen injection conduits 127 from an oxygen source 113. Fuel 115 is fed to burner 109 from fuel source 117. As the fuel 115 and oxygen 111 exit the burner nozzle 125 they begin to mix and combust as they enter the furnace 104 forming a combustion fluid stream 108. The flue gas 129 that is formed leaves the furnace 104 and is carried to a convective section (not shown) or other suitable heat exchanger system to recover heat from the flue gas. The oxygen 111 and fuel 115 mix and enter the furnace 104 a flue gas recirculation zone 145. In the flue gas recirculation zone 145, the oxygen 111 begins mixing with the furnace gases. The mixing in the flue gas recirculation zone 145 causes dilution of the oxygen 111 resulting in reduced combustion. In addition, the flue gas recirculation zone 145 draws flue gases high in slag-forming components and into contact with the burner nozzle 125, which may block or otherwise foul the burner 109. These effects are undesirable and can lead to less stable combustion, lower fuel burnout, and burner degradation. Like in FIG. 1A, the known oxy/coal burner of FIG. 2A includes an oxygen injection conduit 127 arranged around a burner nozzle 125. In addition, the burner 109 includes a recycle flue gas conduit 131 through which recycle flue gas 119 is provided by a recycled flue gas or RFG source 121 or other flue gas recycle device.

In contrast to the systems having these problems and as shown in FIGS. 3A, 3B, 4A and 4B, embodiments of the present disclosure include a precombustor 300 with a step 303 immediately downstream of a solid fuel inlet port 305 before entering a furnace 104. In FIGS. 3A and 3B, the fuel 115 and oxygen 111 exit the inlet port 125 and oxygen injection conduit 127 and enter a chamber 301. The fuel and oxygen are preferably provided as a substantially parallel flow. By "parallel flow" it is meant that the fuel and oxygen are provided in a substantially uniform direction from the inlet port 125 and oxygen injection conduit 127. The parallel flow may include, but is not limited to coaxial flow, unidirectional flow, non-swirling flow, non-vortex flow, or any other flow that includes flow of fluid (e.g., fuel and oxygen) in a single direction. The chamber 301 includes a space or region in which combustion may occur. The chamber preferably permits unobstructed flow of combustion fluid stream 108 through the precombustor 300 to the furnace 104. Oxygen 111 is fed to the precombustor 300 via oxygen injection conduits 127 from an oxygen source 113. Fuel 115 is fed to inlet port 305 and precombustor 300 from fuel source 117. As the fuel 115 and oxygen 111 exit the inlet port 305 and oxygen injection conduit 127 they begin to mix and combust as they pass through the chamber 301 forming a combustion fluid stream 108. The combustion fluid stream 108 includes a stream of fluids that are preferable in the process of combustion. While not so limited, the combustion fluid stream 108 may include a flame. However, the combustion fluid stream 108 may include fluid flow outside of a flame. The combustion fluid stream 108 includes an inertia and velocity that carries the fluids into the furnace 104 as at least partially combusted products. The at least partially combusted products then leave the furnace as flue gas 129. The flue gas 129 leaves the furnace 104 and is carried to a convective section (not shown) or other suitable heat exchanger system to recover heat from the flue gas.

In the embodiment shown in FIGS. 4A and 4B, the precombustor further includes recycle flue gas conduits 131 disposed along the outer edges of the oxygen injection conduits 127. Recycled flue gas 119 is provided to the recycled flue gas conduit 131 from a RFG source 121 or other flue gas recycle component. The recycled flue gas 119 enters the chamber 301 and mixes with the oxygen 111 and the solid fuel 115 in the precombustor recirculation zone 307. Conduits, including, but not limited to, the inlet port 205, the oxygen injection conduit 127 and the recycled flue gas conduit 131, that provide oxygen, recycled flue gas, fuel, fuel carrier and other materials to the combustion fluid stream 108 include the "inlet" of the precombustor 300.

In the illustrated embodiment of FIGS. 3A, 3B, 4A and 4B, the precombustor 300 provides increased contact time between the oxygen and the solid fuel in a precombustor recirculation zone 307. The formation of the precombustor recirculation zone 307 thereby increases localized combustion fluid stream 108 and/or flame temperatures and ignition stability. The precombustor recirculation zone 307 forms within chamber 301 from the recirculation of a portion of the oxygen 111 and solid fuel 115 leaving the inlet port 125 and oxygen injection conduit 127. The dimensions and positioning of the recirculation step 303 provide a region of lower pressure within the precombustor permitting recirculation (i.e. formation of the precombustor recirculation zone 307), while substantially preventing fluids from within the furnace 104 (e.g., the flue gas recirculation 145) from entering the precombustor 300 and interfering with combustion reactions taking place therein. In other words, the confined space of the chamber 301 limits furnace gas entrainment to the burner thus reducing exposure of the burner parts to the corrosive environment of the furnace. Furnace gas entrainment is caused by the recirculation of contaminants in the opposite direction of the combustion fluid stream 108.

The precombustor 300 for oxy/coal combustion having the recirculation step 303 according to embodiments of the present disclosure is capable of being a flame initiator and/or a flame control device. The precombustor 300 may improve the burner durability and lifetime. The precombustor 300 may serve as a flame initiator by preventing dilution of an oxidant and a solid fuel stream by a combustion fluid until combustion has commenced. The oxygen may include synthetic air (e.g., $O_2$ concentration 20%<$O_2$<35%), high concentration $O_2$ synthetic air (35%<O<75%), or substantially pure oxygen ($O_2$>75%). The fuel 115 may be a solid fuel such as coal or petcoke conveyed by a carrier gas such as recycled flue gas, purified $CO_2$, nitrogen, or air. The recycled flue gas (RFG) can be recycled using a high or low temperature stream that is either raw flue gas or more purified in some way such that the water, particulates, $NO_x$, $SO_x$ or other components are reduced.

As shown in FIGS. 3A and 3B, the precombustor 300 includes dimensions that are configured to provide the precombustor recirculation zone 307. The precombustor 300 includes a precombustor length (L). The precombustor length extends from the recirculation step 303 to the entrance of the furnace 104. In addition, the precombustor includes a precombustor diameter ($D_p$) which extends between the outer walls of the chamber 301. In embodiments wherein the cross-sectional geometry is non-circular, the precombustor diameter ($D_p$) may be measured as an average, or otherwise representative diameter. The precombustor 300 further includes a step height (h), which is a length extending from the outer conduit to the outer surface of the chamber 301. For example, in the embodiment of FIG. 3A, the step height (h) is measured from the outermost edge of the internal surface of the oxygen injection conduit 127 to the outer edge of the chamber 301 (e.g., from the furthest point from the inlet port 125 at which oxygen is expelled from the oxygen injection conduit 127 to the inner outside surface of the precombustor). In the embodiment of FIG. 4A, for example, the step height (h) is measure from the outermost edge of the internal surface of the of the recycle flue gas conduit 131 to the outer edge of the chamber 301 (e.g., from the furthest point from the inlet port 125 at which recycled flue gas is expelled from the recycled flue gas conduit 131 to the inner outside surface of the precombustor). In the embodiments including conduits (e.g. recycle fluid gas conduits 131) along the outer edges of the precombustor 300, the step height (h) is measured from the outer edge of oxygen injection conduit 127 circumferentially extending to a surface of the precombustor that permits the formation of the precombustor recirculation zone 307. In other embodiments, step height (h) includes surfaces extending along inner surfaces of precombustor 300 that permit formation of the precombustor recirculation zone 307. The precombustor 300 further includes an inlet diameter (d), which is a length extending between edges of the outer conduits 127, 131 of the precombustor 300. For example, in FIG. 3A, the inlet diameter (d) extends from the outer edges of oxygen injection conduits 127. In the embodiment shown in FIG. 4A, the inlet diameter (d) extends from the outer edges of the recycle flue gas conduits 131.

To create the recirculation zone 307 according to the present disclosure, a minimum precombustor length is used. The relationship between the step height (h) and the minimum precombustor length (L) is shown as follows. A step height (h) that is too large will lead to communication between the precombustor recirculation zone and the furnace gases. To maintain the independence of the recirculation zone 307 the precombustor length must be greater than approximately five times the step height (h).

$$L \geq 5*h \quad [1]$$

Figure 11:
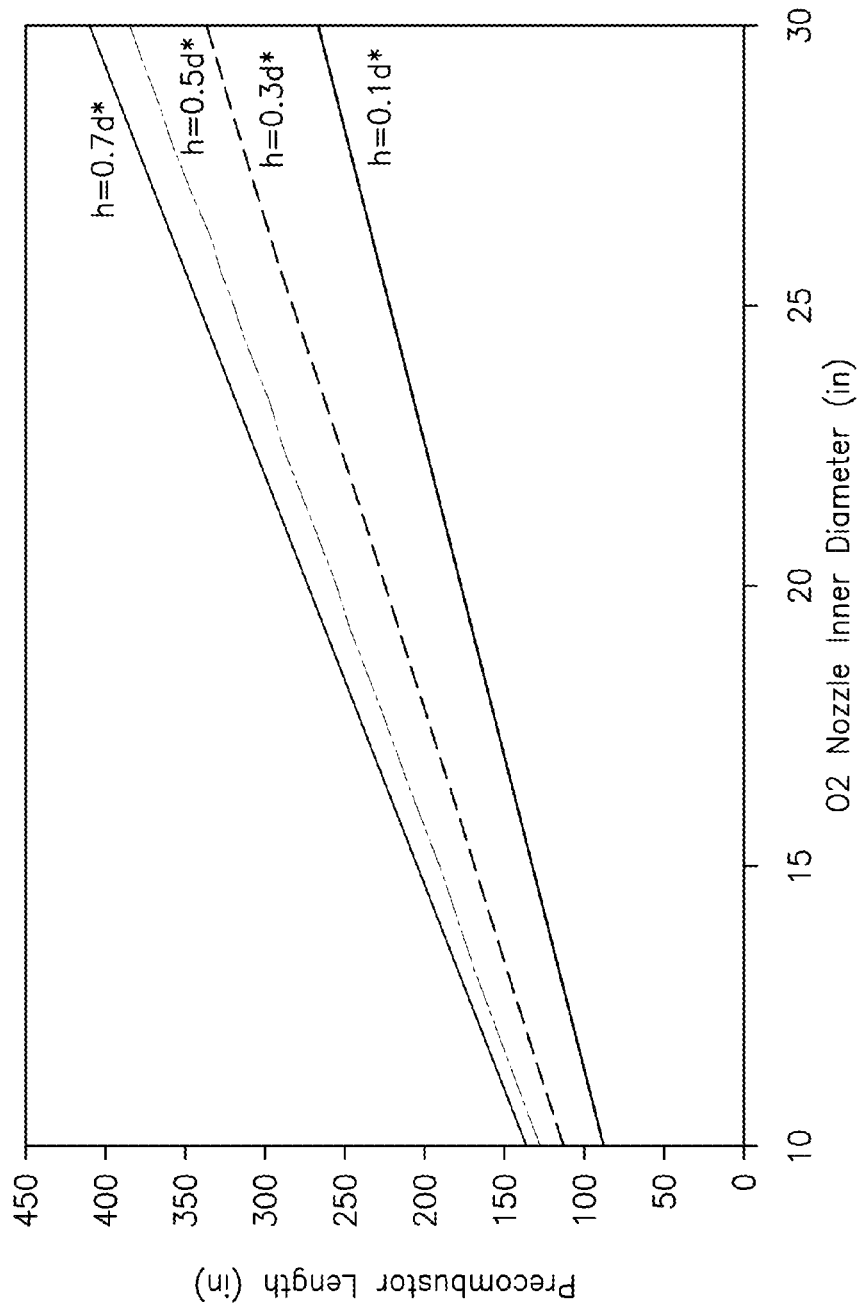
FIG. 11 includes graphical data representing maximum precombustor lengths for various step heights.

However, a precombustor 300 that is too long will lead to excessive precombustor temperatures as the flame grows large enough in diameter to come into contact with the precombustor 300. The maximum precombustor length is related to the step height (h), and the inlet nozzle (d) or precombustor diameter (Dp). To provide the recirculation zone 307 according to the present disclosure, a maximum precombustor length is used. The maximum precombustor length is determined with following relationship (see Equation 2, below and FIG. 11).

$$L \leq 7.4*d + 15.7*h - 9.7*\frac{h^2}{d} \quad [2]$$

Water cooling can be used if there is a need for further temperature reduction of the precombustor 300.

To create the recirculation zone 307 according to the present disclosure, a predetermined ratio of precombustor diameter to the inlet diameter (d) is used. The limits of the ratio of the precombustor diameter ($D_p$) to the inlet diameter (d) is greater than 1.2 and less than 2.4 as shown in equation 3.

$$1.2 \leq \frac{D_p}{d} \leq 2.4 \quad [3]$$

Accordingly, the step 303 height (h) being related to the inlet diameter (d) by equation 4.

$$0.1*d \leq h \leq 0.7*d \quad [4]$$

The improved premixing resulting from inclusion of the precombustor recirculation zone 307 may produce improved burnout with less residual carbon. The higher concentration of oxygen in comparison to using air and the inclusion of the precombustor recirculation zone 307 may provide decreased oxygen consumption costs due to the need for less excess oxygen to complete combustion. The inclusion of the precombustor recirculation zone 307 may permit more control over where the oxygen is introduced thereby resulting in more efficient combustion.

To illustrate the effects of the precombustor on the combustion fluid stream 108, computational fluid dynamics (CFD) simulations were carried out. The commercial CFD package, FLUENT™, was used for this purpose. The results of the modeling are shown in FIGS. 6-10. The simulations used the non-premixed probability density function (PDF) model for combustion, the discrete ordinate model for radiation, and the k-ε model for turbulence. Bituminous coal, carried by $CO_2$, first entered the combustion domain as particles. The devolatization starts once the coal particles reached a temperature of 400 K (260° F.) and continues at a constant rate of 50 1/s until all the volatiles were converted into gaseous fuel. After the devolatization, the remaining coal particles underwent a surface reaction to convert the combustible matter into gaseous fuel. The simulations were carried out at a firing rate of 70 MMBtu/hr. The carrier flow ratio (lb $CO_2$/lb coal) was 1.623. The coal-carrier velocity was around 75 ft/s. The combustion chamber was 20 feet in diameter and 40 feet in length. The convective boundary condition was applied at the chamber wall, where the ambient temperature was 500 K (440° F.) and the heat transfer coefficient was 1000 W/m²-K.

The precombustor step 303 for solid fuel combustion provides at least two features to improve burner performance. FIG. 5 is a representation of stream lines of the combustion fluid stream 108 showing the results of an oxy/coal burner attached to a precombustor 300 with a step 303. In FIG. 5 it can be seen that there exists a precombustor recirculation zone 307 in close proximity to the inlet nozzle that improves mixing between the oxygen and fuel in the combustion fluid stream 108. In a precombustor 300 according to the present disclosure, this precombustor recirculation zone 307 does not communicate with the furnace gases but only recirculates within the chamber 301 of precombustor 300. This lack of communication protects the inlet nozzle from contact with the high concentration of slag producing components in an oxy/coal combustion furnace 104 and prevents the premature dilution of the fuel and oxygen with furnace gases.

The velocities of the substances being transported through the inlet port 300, the solid fuel 115, oxygen 111 and/or the recycled flue gas 119 (see e.g., FIGS. 3A and 4A) may be controlled to improve flame stability thereby resulting in lower unburned carbon in the resulting ash than in traditional methods. Modifying the flow rate of the fluid passing through inlet port 305, the carrier for solid fuel 115, oxygen 111 and/or the recycled flue gas 119 may permit control of the geometry of the flame, improved heat flux, momentum control, and/or flame length control. The recirculation zone 307 also introduces additional drag into the precombustor 300 thereby reducing the exiting flame velocity and promoting mixing between the different streams (e.g., mixing between oxygen 111 and solid fuel 115).

The recirculation effect is illustrated in FIGS. 6-10. In FIGS. 6A-6D the Y-velocity is shown. In FIG. 6A the Y-velocity is shown for a burner similar to that shown in FIG. 1A. FIG. 6B is for the same exiting velocity and inlet port 305 diameter as FIG. 3A, but with a precombustor diameter (Dp=2.3 ft) that is two times the combined inlet port diameter and oxygen injection conduit diameter (d). The length (L) of the precombustor for this case is 7.0 ft. Comparing FIG. 6A to FIG. 6B it can be seen that the precombustor slows the centerline jet combustion velocity. Evidence that this slowing is a result of the recirculation step 303 (h) can be seen in FIGS. 6C and 6D. These two FIGs. have the same precombustor diameter ($D_p$=1.7 ft) and precombustor length (L=3.5 ft) and the same firing rate, but for FIG. 6C h=0, while for FIG. 6D h=3.8 inches. Comparing these two figures it can be seen that the centerline combustion jet velocity is slower for FIG. 6D than for FIG. 6C.

Figure 8:
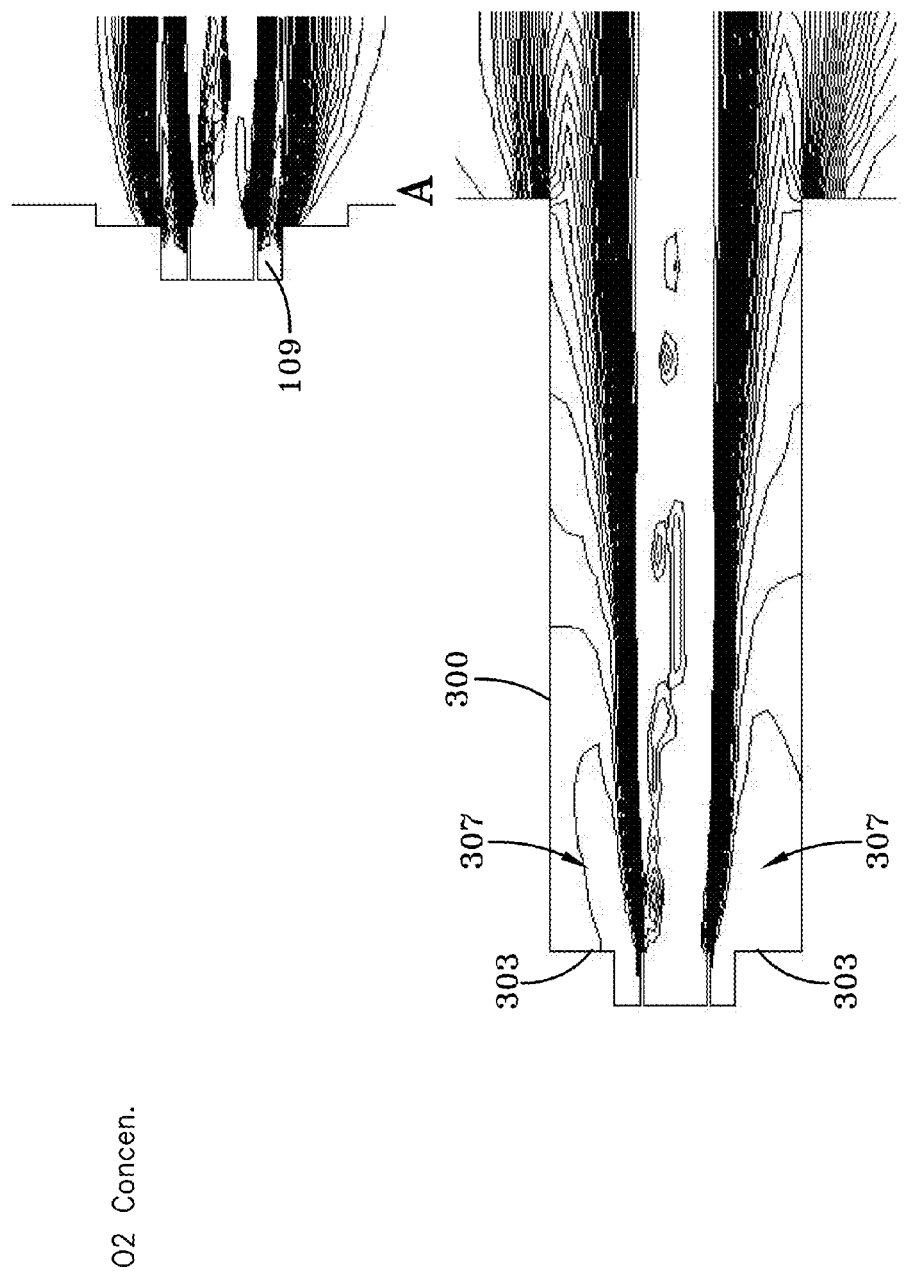
FIG. 8 shows oxygen concentration for alternative fuel streams of combustion systems with and without precombustors.
Figure 10:
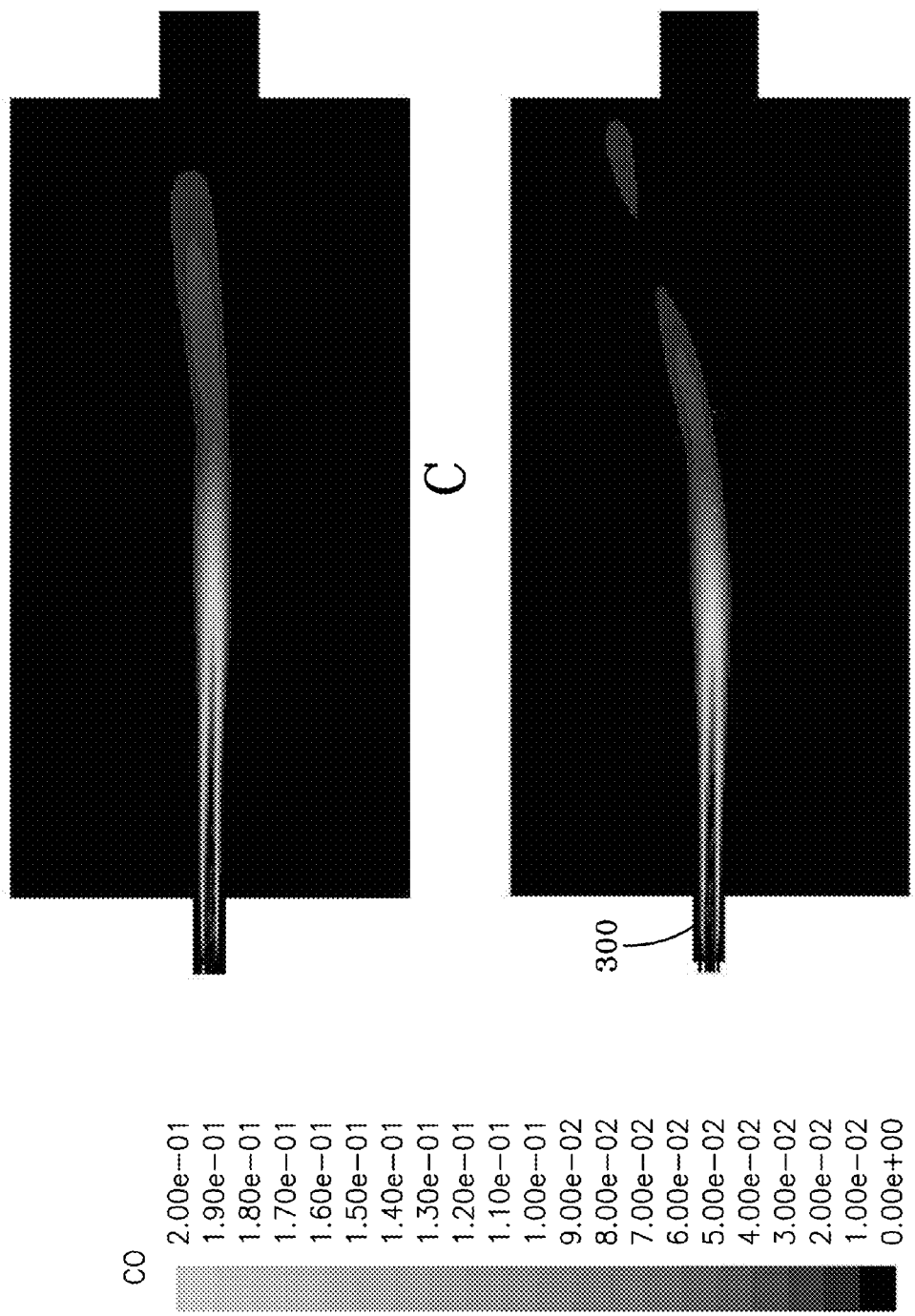
FIG. 10 shows carbon monoxide concentration for alternative fuel streams of combustion systems with and without precombustors.

The result of the recirculation zone on the mixing between the oxidant stream and fuel stream can be seen in FIGS. 7A-7D and FIGS. 8A-8D. For the remaining simulation figures the subsets A, B, C, and D indicate the same simulation cases as explained for FIGS. 6A-6D. FIG. 7 shows the oxygen concentration in the precombustor 300 and throughout the furnace. Here it can be seen that the precombustor 300 with step 303 provides additional mixing over the case without a precombustor (see e.g., FIG. 8A) or without a step 303 (see e.g., FIG. 8B). This can especially be seen in the short distances near the precombustor 300 as shown in FIG. 8 where each contour line represents a uniform concentration, where each adjacent contour line includes identical concentration differences. FIG. 8B shows the dramatic decrease in $O_2$ concentration along the length of the precombustor 300 due to mixing with the fuel stream and not the furnace gases. FIG. 8A shows the substantially immediate dilution of the oxygen stream with furnace gases in the furnace 104 which leads to a longer flame length (see FIGS. 9 and 10). FIG. 8D with a precombustor step 303 also shows more oxygen mixing with the fuel stream than FIG. 8C without a precombustor step 303, however the difference is not as dramatic. This is due to a smaller step height (h) for FIG. 8D than for FIG. 8B. In addition there is some mixing between the oxygen and the fuel stream due to the differences in stream velocities. Since the oxygen inlet area (i.e., the oxygen injection conduit 127) is larger in FIG. 8C than in FIG. 8D, the oxygen velocity is lower. This lower velocity leads to an increase in the velocity difference between the oxygen and fuel stream which thereby promotes additional mixing. As the step 303 height increases, the magnitude of the mixing between the oxygen and fuel stream increases.

The precombustor 300 provides a barrier between the furnace 104 and the inlet port 305 oxygen injection conduit 127 and/or recycled flue gas conduit 131. The metal components in the inlet port 305 oxygen injection conduit 127 and/or recycled flue gas conduit 131 are protected from the main flame radiation in the furnace 104 by the shielding provided by the presence of the precombustor 300. This barrier may provide additional protection to tips, nozzles and/or or other structures which may be present on one or more of the inlet port 305 oxygen injection conduit 127 and/or recycled flue gas conduit 131. The comparison between the near burner face flame temperatures in the absence of and in the presence of a precombustor can be seen in FIG. 9. As shown in FIGS. 9A, 9C and 9D, temperatures were estimated using computational fluid dynamics (CFD) and show lower temperatures present in the regions near the inlet port 305 oxygen injection conduit 127 and/or recycled flue gas conduit 131. In contrast, as shown in FIG. 9A, high temperatures are seen at and near burner 109.

In addition to a shorter flame length induced by the stepped precombustor 300, the combustion intensity is also increased. FIG. 6B shows a higher maximum flame temperature for the precombustor with a step than without a precombustor shown in FIG. 6A. Likewise FIG. 7B shows a higher maximum concentration of CO than in FIG. 7A indicating the higher combustion intensity. In FIGS. 6C, 6D, 7C, and 7D a slightly shorter flame length is also seen for the precombustor with a step, but the effects are smaller for the reasons mentioned above. All of these results demonstrate that a precombustor with a step provides better mixing between the oxidant and fuel stream thereby leading to a shorter and more stable flame and more intense combustion near the precombustor exit. These results lead to better fuel burnout. The carbon burnout for the precombustor with step compared to the burner without a precombustor was 55% higher at the midpoint of the furnace.

The velocity of the fuel stream is preferably between approximately 50 and 100 feet per second. The oxidant velocity, and optionally the RFG stream velocity which should approximate the oxidant velocity, should be preferably less than the fuel stream velocity to promote the precombustor recirculation zone 307, but may be at a slightly higher velocity than the fuel stream. Example configurations that follow the aforementioned design parameters are shown in Table 1 for a bituminous coal burning in $O_2$ using 1.6 lb of $CO_2$ to convey 1 lb of coal with 2% excess $O_2$ and assuming a metal wall thickness of 0.3 inches. Results are shown for the minimum and maximum step size limited by Equation 4.

TABLE 1

Example Configuration

| | Step height | Firing Rate (MMBtu/hr) | | | |
|---|---|---|---|---|---|
| | | 50 | 100 | 200 | 500 |
| Fuel Velocity (ft/s) | | 75 | 75 | 75 | 75 |
| Fuel nozzle inner diameter (in) | | 5.8 | 8.2 | 11.6 | 18.4 |
| O2 velocity | | 75 | 75 | 75 | 75 |
| O2 nozzle inner diameter (in) | | 11.0 | 15.3 | 21.6 | 33.9 |
| Precombustor inner diameter (in) | min | 13.2 | 18.4 | 25.9 | 40.7 |
| | max | 26.4 | 36.7 | 51.8 | 81.4 |
| Minimum precombustor length (in) | min | 5.5 | 7.7 | 10.8 | 17.0 |
| | max | 38.5 | 53.6 | 75.6 | 119 |
| Maximum precombustor length (in) | min | 97.6 | 136 | 192 | 301 |
| | max | 150 | 209 | 295 | 462 |

The present disclosure includes a combustion device for solid fuel (preferably coal, petcoke, or biomass) combustion connected to a precombustor immediately adjacent to the furnace in contrast to a burner without a precombustor (compare FIGS. 1A, 2A, 3A and 4A). The burner consists of a solid fuel stream (and carrier fluid) surrounded by an oxidant stream and optionally a RFG stream. The streams typically enter the precombustor unmixed with substantially no swirl. The precombustor inner diameter is larger than the burner exit nozzle to create a recirculation zone near the burner tip. The cross section of the burner and precombustor is preferably, but not limited to, substantially a circular geometry.

Precombustor and system designs incorporating recycled flue gas (RFG) may also be utilized. Exemplary embodiments utilizing oxygen injection and recycled flue gas is shown in FIGS. 12A, 12B, 13A, 13B, 14A, 14B, 15A, 15B, 16A, and 16B. The arrangements in each of the FIGS. 12A, 12B, 13A, 13B, 14A, 14B, 15A, 15B, 16A, and 16B includes the components shown and discussed above with respect to FIGS. 3A, 3B, 4A and 4B. In FIGS. 12A and 12B the RFG 119 is added to the fuel 115 and carrier gas stream from RFG source 121. In FIGS. 13A and 13B, the RFG 119 is added to the oxygen 111 thereby diluting the oxygen concentration but lowering the combustion fluid stream 108 temperature. In FIGS. 14A and 14B and 15A and 15B the RFG 119 is added to the outside of the oxygen 111. When adding RFG 119 to the precombustor, the embodiments injection RFG 119 to the outside of the oxygen is more preferred because the RFG 119 does not dilute the oxygen 111 and solid fuel 115 and create a less stable and intense combustion. However, in other embodiments no RFG 119 is added. FIGS. 15A and 15B is a desirable configuration when adding RFG 119 because the RFG 119 is added downstream of the recirculation step 303 thereby limiting the mixing between the RFG 119 and oxygen 111 while providing a protection to the precombustor 300 from the flame. Additionally an oxidant stream in addition to oxygen 111 may be added in the center of fuel 115 to further improve flame stability in any of the invention embodiments.

In a preferred embodiment of the invention, the attached burner is generally circular with a center annulus solid fuel 115 surrounded by an oxidant stream. The solid fuel 115 is conveyed by a small amount of RFG and the oxygen is substantially pure oxygen (>90%). Optionally the solid fuel 115 may be conveyed by air, nitrogen, or synthetic air. See e.g., FIGS. 12A and 12B.

Figure 14B:
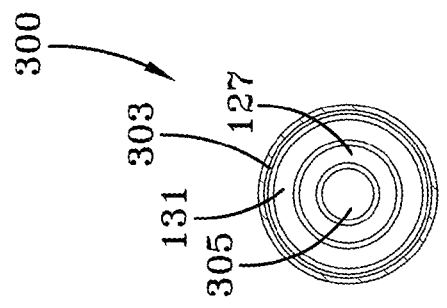
FIG. 14B is a sectional view of the system of FIG. 14A taken in direction 14B-14B.
Figure 14A:
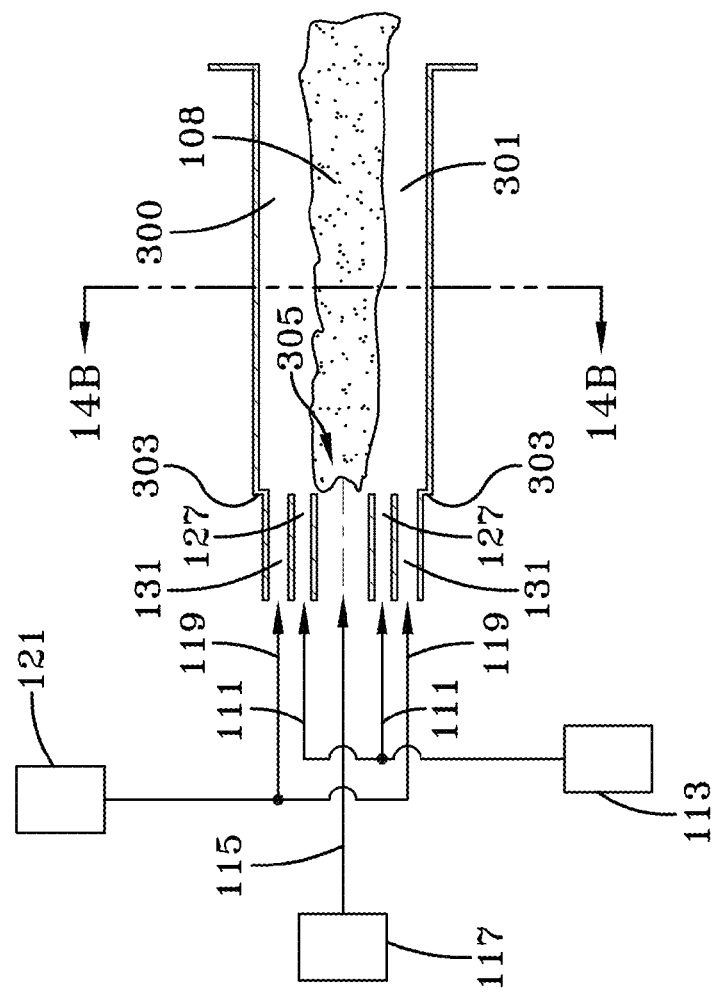
FIG. 14A illustrates a diagrammatic representation of a precombustor according to another embodiment of the present disclosure.
Figure 19:
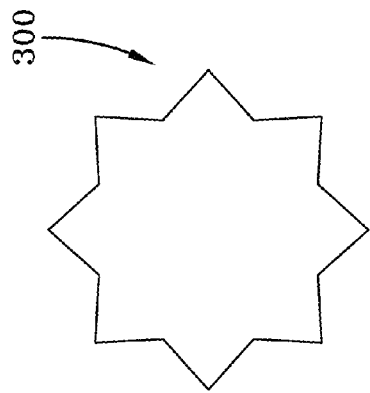
FIG. 19 shows an exemplary cross-sectional geometry for a precombustor according to still another embodiment.
Figure 22:
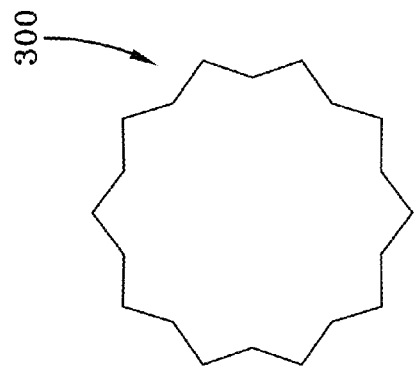
FIG. 22 shows an exemplary cross-sectional geometry for a precombustor according to still another embodiment.
Figure 18:
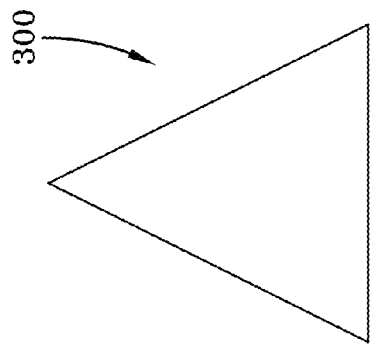
FIG. 18 shows an exemplary cross-sectional geometry for a precombustor according to another embodiment.
Figure 21:
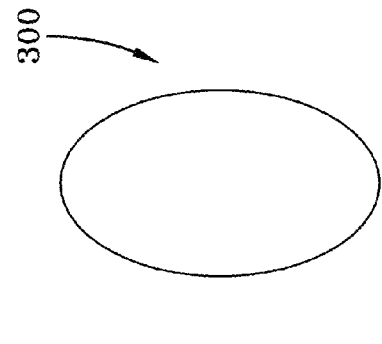
FIG. 21 shows an exemplary cross-sectional geometry for a precombustor according to still another embodiment.
Figure 17:
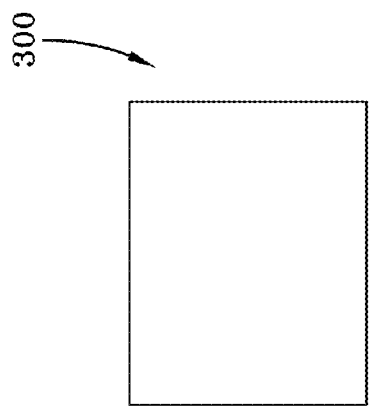
FIG. 17 shows an exemplary cross-sectional geometry for a precombustor according to an embodiment.
Figure 20:
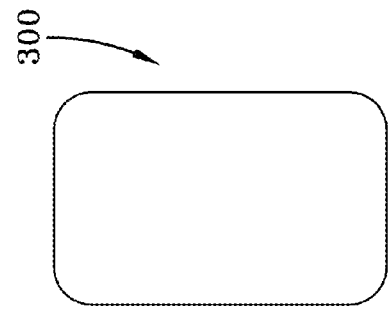
FIG. 20 shows an exemplary cross-sectional geometry for a precombustor according to still another embodiment.

In another embodiment of the invention, the attached precombustor 300 is generally circular with a center annulus solid fuel stream surrounded by an oxygen stream further surrounded by RFG. The solid fuel 115 is conveyed by a small amount of RFG and the oxygen is substantially pure oxygen (>90%) or synthetic air. Optionally the solid fuel may be conveyed by air, nitrogen, or synthetic air. The preferred configuration is shown in FIGS. 14A and 14B.

In another embodiment the precombustor may include a center annulus providing a second oxygen stream which is at least partially surrounded by fuel, which is further surrounded by oxygen.

The perimeter of the fuel and O₂ nozzle may also be non-circular to promote additional mixing between the two streams. Examples of possible interfaces between the two streams are shown in FIGS. 17-22.

Due to the precombustor step, the disclosure may be applied to not only solid fuels, but low calorific gaseous (i.e. lower heating value on a volumetric basis than $H_2$) and liquid fuels due to their difficulting in achieving stable combustion. Examples of these fuels include purification system waste gas (e.g. pressure swing adsoption pruge gas), blast furnace off gas, glycerol, and waste liquid fuel with high water content. The step within the precombustor provides additional flame stability for these fuels that is not shown in the prior art.

While the above has been shown and described with respect to precombustors 300 that are attached to or in close proximity to a furnace, the precombustor 300 may also be provided in other parts of the combustion system, such as in the convective section or in other sections of the combustion system. Further, the precombustors 300 may be disposed in locations remote from the furnace or other section of the combustion system, wherein the combustion fluid stream 108 is directed or otherwise fed to the furnace or other sections of the combustion system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A precombustor comprising:
a chamber bounded by a first end, outer walls, and a second end; and
an inlet configured to deliver a substantially parallel flow of solid fuel surrounded by oxygen through the first end of the chamber,
wherein the first end of the chamber includes a recirculation step immediately downstream of the inlet and the second end of the chamber fluidly communicates with a furnace;
wherein the inlet and the recirculation step are arranged to form a recirculation zone within the chamber of at least a portion of the solid fuel and the oxygen exiting the inlet, the recirculation step having a step height h from an edge of the inlet to an edge of the chamber defined by the outer walls;
wherein the inlet is further configured to provide recycled flue gas; and
wherein the inlet is further configured to provide recycled flue gas downstream of the recirculation step.

2. The precombustor of claim 1, wherein the inlet includes an inlet port configured to provide the solid fuel.

3. The precombustor of claim 1, wherein the precombustor is configured such that:

$$1.2 \leq \frac{D_p}{d} \leq 2.4$$

wherein $D_p$ is the chamber diameter and d is the inlet diameter.

4. The precombustor of claim 1, wherein the chamber has length (L) and that is greater than or equal to about 5 times the recirculation step height (h).

5. The precombustor of claim 1, wherein the precombustor is configured such that:

$$L \leq 7.4 * d + 15.7 * h - 9.7 * \frac{h^2}{d}$$

wherein L is precombustor length and d is the inlet diameter.

6. The precombustor of claim 1, wherein the precombustor is configured such that:

$$0.1 * d \leq h \leq 0.7 * d$$

wherein d is the inlet diameter.

7. The precombustor of claim 1, wherein the precombustor includes a circular cross-sectional geometry.

8. The precombustor of claim 1, wherein the precombustor includes a non-circular cross-sectional geometry.

9. The precombustor of claim 1, wherein the inlet is configured to deliver a second oxygen stream which is at least partially surrounded by fuel.

10. A combustion system comprising:
a furnace; and
at least one precombustor, the at least one precombustor having a chamber bounded by a first end, outer walls, and a second end, and an inlet configured to deliver a substantially parallel flow of solid fuel surrounded by oxygen through the first end of the chamber, the first end further including a recirculation step immediately downstream of the inlet, the second end fluidly communicating with the furnace;
wherein the inlet and the recirculation step are arranged to form a recirculation zone within the chamber of at least a portion of the solid fuel and the oxygen exiting the inlet, the recirculation step having a step height from an edge of the inlet to an edge of the chamber defined by the outer walls;
wherein the inlet is further configured to provide recycled flue gas; and
wherein the inlet is further configured to provide recycled flue gas downstream of the recirculation step.

11. The system of claim 10, wherein the inlet includes a inlet port configured to provide the solid fuel.

12. The system of claim 10, wherein the precombustor is configured such that:

$$1.2 \leq \frac{D_p}{d} \leq 2.4$$

wherein $D_p$ is the chamber diameter and d is the inlet diameter.

13. The system of claim 10, wherein the chamber has length (L) and that is greater than or equal to about 5 times the recirculation step height (h).

14. The system of claim 10, wherein the precombustor is configured such that:

$$L \leq 7.4*d + 15.7*h - 9.7*\frac{h^2}{d}$$

wherein L is precombustor length and d is the inlet diameter.

15. The system of claim 10, wherein the precombustor is configured such that:

$$0.1*d <= h <= 0.7*d$$

wherein d is the inlet diameter.

16. The system of claim 10, wherein the precombustor includes a circular cross-sectional geometry.

17. The system of claim 10, wherein the precombustor includes a non-circular cross-sectional geometry.

18. The system of claim 10, wherein the inlet is configured to deliver a second oxygen stream which is at least partially surrounded by fuel.

19. A method for operating a combustion system comprising:
providing a furnace;
providing at least one precombustor, the precombustor having a chamber bounded by a first end, outer walls, and a second end, and an inlet configured to deliver a substantially parallel flow of solid fuel surrounded by oxygen through the first end of the chamber, wherein the concentration of $O_2$ is at least 35%, the first end further including a recirculation step immediately downstream of the inlet, the second end fluidly communicating with the furnace; and
delivering the solid fuel and the oxygen to the inlet to form a recirculation zone within the chamber of at least a portion of the solid fuel and the oxygen exiting the inlet, the recirculation step having a step height h from an edge of the inlet to an edge of the chamber defined by the outer walls; wherein the length of the precombustor is sufficient to prevent a flame generated by the system from contacting the precombustor;
wherein the inlet provides recycled flue gas; and
wherein the inlet provides recycled flue gas downstream of the recirculation step.

20. The method of claim 19, further comprising delivering a second oxygen stream which is at least partially surrounded by fuel.

21. The method of claim 19 wherein the recirculation zone is located within the chamber of the precombustor.

* * * * *